(12) United States Patent
Wang et al.

(10) Patent No.: US 12,467,271 B2
(45) Date of Patent: Nov. 11, 2025

(54) RECYCLABLE CYLINDRICAL STRUCTURE AND USAGE METHOD THEREOF

(71) Applicants: China National Chemical Engineering No. 13 Construction Co., Ltd, Cangzhou (CN); Hainan University, Haikou (CN)

(72) Inventors: Qunwei Wang, Cangzhou (CN); Youliang Zhang, Haikou (CN)

(73) Assignees: China National Chemical Engineering No. 13 Construction Co., Ltd, Cangzhou (CN); Hainan University, Haikou (CN)

(*) Notice: Subject to any disclaimer, the term of this patent is extended or adjusted under 35 U.S.C. 154(b) by 243 days.

(21) Appl. No.: 18/534,110

(22) Filed: Dec. 8, 2023

(65) Prior Publication Data
US 2024/0240488 A1 Jul. 18, 2024

Related U.S. Application Data

(63) Continuation of application No. PCT/CN2023/111206, filed on Aug. 4, 2023.

(30) Foreign Application Priority Data

Jan. 17, 2023 (CN) .......................... 202310059842.3

(51) Int. Cl.
*E04H 12/34* (2006.01)
*E04H 12/08* (2006.01)
*E04H 12/12* (2006.01)

(52) U.S. Cl.
CPC ......... *E04H 12/342* (2013.01); *E04H 12/348* (2013.01); *E04H 12/08* (2013.01); *E04H 12/12* (2013.01)

(58) Field of Classification Search
CPC ............................ E04H 12/342; E04H 12/348
See application file for complete search history.

(56) References Cited

U.S. PATENT DOCUMENTS

| | | | |
|---|---|---|---|
| 8,468,776 B2 * | 6/2013 | Cortina-Ortega | F03D 13/20 52/843 |
| 2017/0183840 A1 * | 6/2017 | Tozer | E02D 27/425 |
| 2020/0306658 A1 * | 10/2020 | Lin | A63H 33/088 |

FOREIGN PATENT DOCUMENTS

| | | |
|---|---|---|
| CN | 101305143 A | 11/2008 |
| CN | 110397334 A | 11/2019 |

(Continued)

*Primary Examiner* — Joshua K Ihezie
(74) *Attorney, Agent, or Firm* — AP3 Law Firm PLLC

(57) ABSTRACT

Recyclable cylindrical structures and usage methods are provided. A recyclable cylindrical structure includes multiple prefabricated cylindrical units. Each unit is provided with a ring block coaxially fixed on the top of the unit, a ring slot coaxially formed in the bottom of the unit, two first sealing rings arranged on the top of the unit and a second sealing ring arranged on the top of the ring block of the unit. The ring block is provided with multiple first connection elements. Multiple second connection elements are arranged in the ring slot. For two adjacent prefabricated cylindrical units of the recyclable cylindrical structure, the ring block of the lower unit inserts into the ring slot of the upper unit and the first connection elements of the lower unit are corresponding and jammed one-to-one with the second connection elements of the upper unit.

13 Claims, 14 Drawing Sheets

(56) References Cited

FOREIGN PATENT DOCUMENTS

| | | |
|---|---|---|
| CN | 113090019 A | 7/2021 |
| CN | 1130187668 A | 7/2021 |
| CN | 214740355 U | 11/2021 |
| CN | 113846891 A | 12/2021 |
| CN | 113944363 A | 1/2022 |
| CN | 215949074 U | 3/2022 |
| CN | 115450846 A | 12/2022 |
| DE | 102016113224 | 11/2017 |
| JP | H09235912 A | 9/1997 |
| KR | 100903345 B1 | 6/2009 |

* cited by examiner

RECYCLABLE CYLINDRICAL STRUCTURE AND USAGE METHOD THEREOF

CROSS-REFERENCE TO RELATED APPLICATIONS

This application is a continuation application of International Application No. PCT/CN2023/111206, filed on Aug. 4, 2023 and entitled "recyclable cylindrical structure and usage method thereof", which claims priority to Chinese Patent Application No. CN 202310059842.3, filed on Jan. 17, 2023 and entitled "recyclable cylindrical structure and usage method thereof". The disclosures of the aforementioned applications are hereby incorporated herein by reference in their entireties.

TECHNICAL FIELD

The present disclosure relates to engineering structures and, more specifically, to recyclable cylindrical structures and usage methods thereof.

BACKGROUND

Chimneys, prilling towers, silos and the like, all of which are towering cylindrical structures, are widely used in the chemical industry. In the prior art, most cylindrical structures are constructed sequentially from bottom to top and the construction period is often very long. In addition, with the continuous acceleration of technological renewal in the chemical industry, cylindrical structures often need to be demolished due to process improvements or other reasons before they have reached the end of their service life. The commonly used demolition method in the prior art is blasting demolition, which will not only lead to the waste of construction materials, but also produce a large amount of dust pollution and construction waste. Therefore, blasting demolition is increasingly unable to adapt to the current development idea of energy conservation and environmental protection.

SUMMARY

This and other problems are generally solved or circumvented, and technical advantages are generally achieved, by embodiments of the present disclosure which provides recyclable cylindrical structures and usage methods thereof.

Technical Problems

The present disclosure provides recyclable cylindrical structures and usage methods thereof to at least solve the problems that the construction period of the cylindrical structures in the prior art is long and the demolition leads to the waste of construction materials and environmental pollution.

Technical Solutions

In first aspect, the present disclosure provides recyclable cylindrical structures. A recyclable cylindrical structure includes a plurality of prefabricated cylindrical units connected with one on top of the other along axes of the prefabricated cylindrical units. Each prefabricated cylindrical unit is provided with a ring block, a ring slot, two first sealing rings and a second sealing ring.

The ring block is coaxially fixed on the top of each prefabricated cylindrical unit. The ring block is provided with a plurality of first connection elements which are circumferentially fixed on the side wall of the ring block. Each first connection element is wedge-shaped with tip up. The bottom of each first connection element is formed as a first plane for jamming.

The ring slot is coaxially formed on the bottom of each prefabricated cylindrical unit. A plurality of second connection elements are arranged in the ring slot. The second connection elements are circumferentially fixed on the inner side wall of the ring slot. Each second connection element is wedge-shaped with tip down. The top of each second connection element is formed as a second plane for jamming. Each first connection element and/or each second connection element has an elasticity to radially deform.

The two first sealing rings are arranged on the top of each prefabricated cylindrical unit, with the ring block positioned between the two first sealing rings. The second sealing ring is arranged on the top of the ring block of each prefabricated cylindrical unit.

For every two adjacent prefabricated cylindrical units of the recyclable cylindrical structure, the ring block fixed on the lower prefabricated cylindrical unit of two adjacent prefabricated cylindrical units is inserted into the ring slot formed in the upper prefabricated cylindrical unit of two adjacent prefabricated cylindrical units.

The first connection elements fixed on the side wall of the ring block of the lower prefabricated cylindrical unit correspond to and jammed with, one-to-one, the second connection elements fixed on the inner side wall of the ring slot formed in the upper prefabricated cylindrical unit.

Each first connection element fixed on the ring block of the lower prefabricated cylindrical unit is above a corresponding second connection element fixed in the ring slot of the upper prefabricated cylindrical unit.

The first plane for jamming of each first connection element fixed on the ring block of the lower prefabricated cylindrical unit is in contact with the second plane for jamming of the corresponding second connection element fixed in the ring slot of the upper prefabricated cylindrical unit, such that the lower prefabricated cylindrical unit and the upper prefabricated cylindrical unit are kept from moving up and down relative to each other.

The gap between the side wall of the ring block of the lower prefabricated cylindrical unit and the inner side wall of the ring slot of the upper prefabricated cylindrical unit is grouted by slurries.

The bottom of the upper prefabricated cylindrical unit is in contact with the two first sealing rings arranged on the top of the lower prefabricated cylindrical unit. The bottom of the ring slot of the upper prefabricated cylindrical unit is in contact with the second sealing ring arranged on the top of the ring block of the lower prefabricated cylindrical unit.

In second aspect, the present disclosure provides usage methods of the recyclable cylindrical structures provided in the first aspect, which include a constructing method and a recycling method.

The constructing method includes steps S100a to S700a as follows.

S100a: simultaneously constructing a foundation and fabricating all the prefabricated cylindrical units of the recyclable cylindrical structure.

S200a: simultaneously installing a first hoisting device and carrying out a trial installation on ground for every two adjacent prefabricated cylindrical units of all the prefabricated cylindrical units.

S300a: installing a first prefabricated cylindrical unit as the bottommost prefabricated cylindrical unit of the recyclable cylindrical structure.

S400a: hoisting a second prefabricated cylindrical unit to the first lower prefabricated cylindrical unit to cause the ring block coaxially fixed on the top of the first prefabricated cylindrical unit to be inserted into the ring slot coaxially formed on the bottom of the second prefabricated cylindrical unit, to cause all the first connection elements fixed on the ring block of the first prefabricated cylindrical unit to be jammed with, one-to-one, all the second connection elements fixed in the ring slot of the upper prefabricated cylindrical unit, and to simultaneously cause the two first sealing rings arranged on the top of the first prefabricated cylindrical unit to be in contact with the bottom of the second prefabricated cylindrical unit and cause the second sealing ring arranged on the top of the ring block fixed on the first prefabricated cylindrical unit to be in contact with the bottom of the ring slot formed in the second prefabricated cylindrical unit.

S500a: grouting the gap between the side wall of the ring block of the first prefabricated cylindrical unit and the inner side wall of the ring slot of the second prefabricated cylindrical unit by slurries.

S600a: lifting a crossbeam of the first hoisting device and repeating steps S400a and S500a until a last prefabricated cylindrical unit is installed as the topmost prefabricated cylindrical unit of the recyclable cylindrical structure.

S700a: dismantling the first hoisting device.

The recycling method includes steps S100b to S600b as follows.

S100b: installing a second hoisting device.

S200b: pushing two first auxiliary elements arranged on the outer side wall of the topmost prefabricated cylindrical unit of the recyclable cylindrical structure, using a pushing mechanism arranged on the second device, to drive the topmost prefabricated cylindrical unit to horizontally rotate relative to a third prefabricated cylindrical unit that is adjacent to and below the topmost prefabricated cylindrical unit, such that the first connection elements fixed on the ring block of the third prefabricated cylindrical unit are dis-jammed with, one-to-one the second connection elements fixed in the ring slot of the topmost prefabricated cylindrical unit.

S300b: lifting the topmost prefabricated cylindrical unit, using the second hoisting device, to cause the ring block of the third prefabricated cylindrical unit to be detached from the ring slot of the topmost prefabricated cylindrical unit.

S400b: lowering the topmost prefabricated cylindrical unit to ground, using the second hoisting device.

S500b: lowering a crossbeam of the second hoisting device and repeating steps S200b, S300b and S400b until the bottommost prefabricated cylindrical unit of the plurality of prefabricated cylindrical units is uninstalled from the foundation.

S600b: dismantling the second hoisting device.

Advantageous Effects of the Disclosure

The advantageous effects of the recyclable cylindrical structure provided by the present disclosure are as follows. The recyclable cylindrical structure is constructed by connecting several prefabricated cylindrical units from bottom to top, where the ring block of a lower prefabricated cylindrical unit is inserted into the ring slot of an upper prefabricated cylindrical unit which is adjacent to the lower prefabricated cylindrical unit and the first connection elements arranged on the ring block of the lower prefabricated cylindrical unit correspond to and are jammed with, one-to-one, the second connection elements arranged in the ring slot of the upper prefabricated cylindrical unit, thus two adjacent prefabricated cylindrical units can be connected and fixed reliably with each other. In addition, the gap between the side wall of the ring block and the inner side wall of the ring slot is grouted by slurries, thus the connection gap between the two adjacent prefabricated cylindrical units is sealed. In the construction process of the recyclable cylindrical structure, the fabrication of the prefabricated cylinder units and the construction of foundation can be carried out simultaneously, and the installation of the prefabricated cylinder units can be carried out immediately after the foundation construction is completed, thus the construction period is greatly shortened, and the construction efficiency is improved. When the recyclable cylindrical structure needs to be demolished, since the strength of solidified slurries is low, two adjacent prefabricated cylindrical units can rotate relative to each other driven by an external torque to make the first connection elements and the second connection elements be dis-jammed. Then, the upper prefabricated cylindrical unit can be lifted, while the ring block fixed on the top of the lower prefabricated cylindrical unit detaches from the ring slot formed on the bottom of the upper lower prefabricated cylindrical unit, to realize demolition. In the demolition process of the recyclable cylindrical structure provided by the present embodiment, there is almost no dust pollution and construction waste. In addition, after being demolished, the prefabricated cylindrical units can be recycled and used again, thus saving construction materials and adapting to the development idea of energy conservation and environmental protection.

The advantageous effects of the usage methods of the recyclable cylindrical structures are as follows. By performing the usage methods which include the constructing method and the recycling method, the construction period of the recyclable cylindrical structure is short, the construction efficiency is high, the demolition of the recyclable cylindrical structure almost does not produce dust pollution and construction waste, and the prefabricated cylindrical units can be recycled and used again, thus saving construction materials and adapting to the development idea of energy conservation and environmental protection.

BRIEF DESCRIPTION OF THE DRAWINGS

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
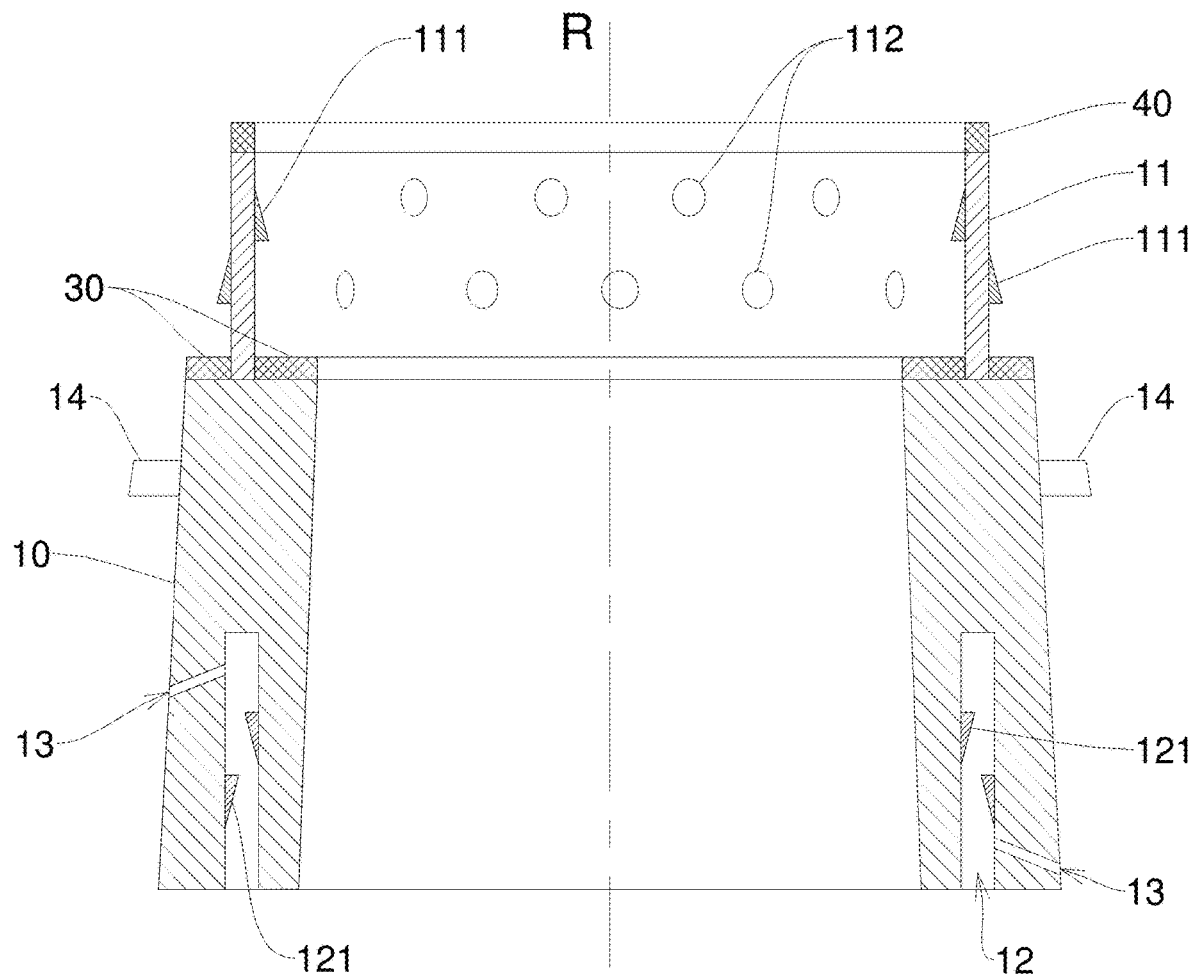
FIG. 1 is a schematic sectional view of a prefabricated cylindrical unit of a recyclable cylindrical structure according to embodiments of the present disclosure.

In order to make the technical problems to be solved, technical solutions and advantageous effects of the present disclosure more clearly, the present disclosure is described in detail below in conjunction with drawings and embodiments. However, it should be understood that the specific embodiments described below are merely illustrative, and do not limit the present disclosure.

It should be noted that when a component is said to be "arranged" on another component, it can be connected directly or indirectly to another component. It should be noted that the direction or position relationship indicated by the terms, such as "length", "width", "up", "down", "front", "back", "top", "bottom", "inner", "outer" and the like, is usually based on the direction or position relationship shown in the drawings, only for the sake of description and simplifying the description. These direction and position terms do not indicate and imply that the devices or components referred to must have a specific direction and position, or must be constructed and operated in a specific direction and position. In a word, these direction and position terms cannot be understood as a limitation of the present disclosure. The terms "first", "second" and the like are merely used for descriptive purposes and should not be construed as indicating or implying relative importance or implying the number of technical features. Thus, the number of the features that are described with terms "first", "second" and the like may explicitly or implicitly be one or more. In the description of the present disclosure, "many", "several" means two or more, unless otherwise expressly and specifically qualified.

Figure 2:
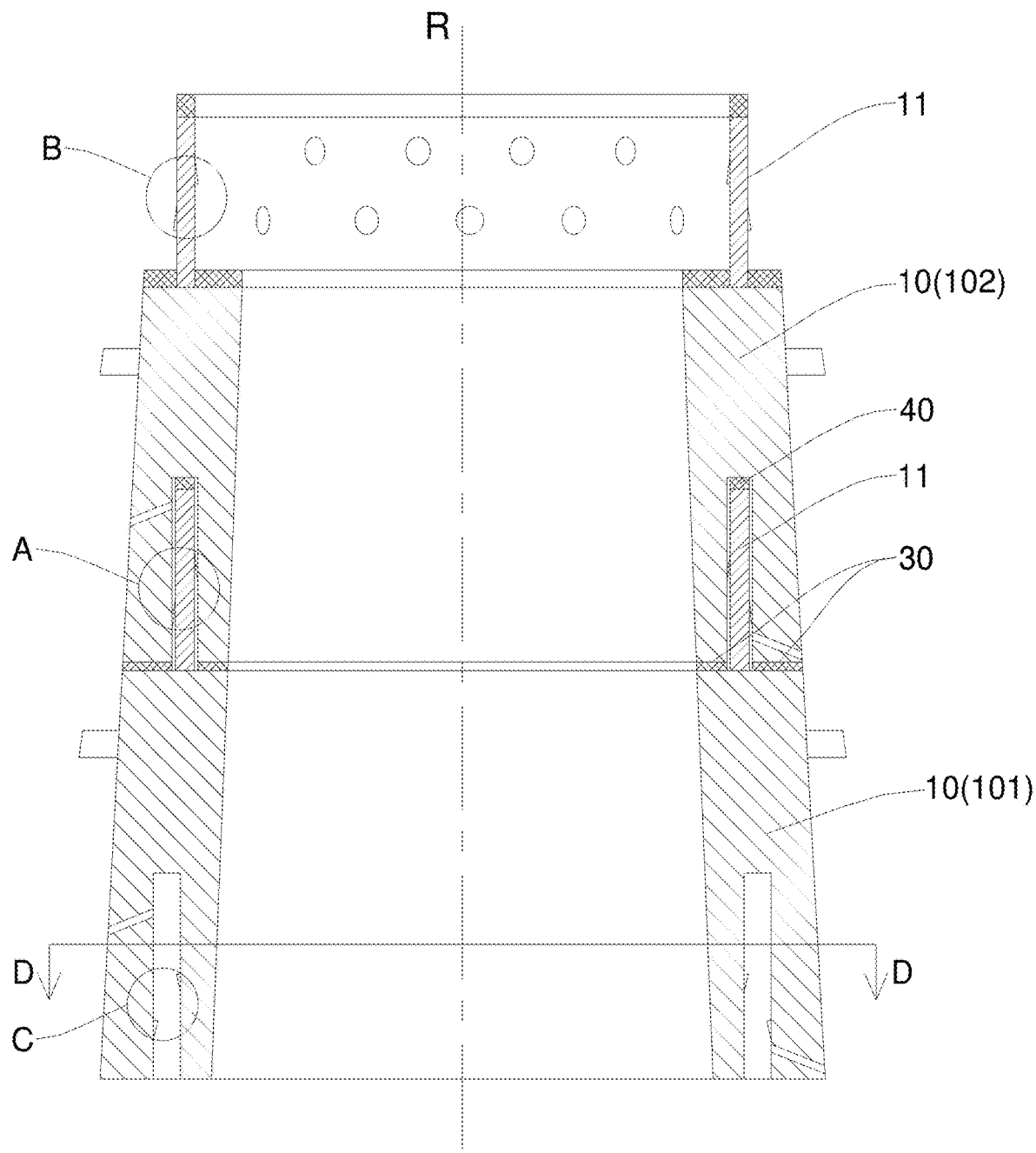
FIG. 2 is a schematic sectional view of two adjacent prefabricated cylindrical units of a recyclable cylindrical structure according to embodiments of the present disclosure.
Figure 3:
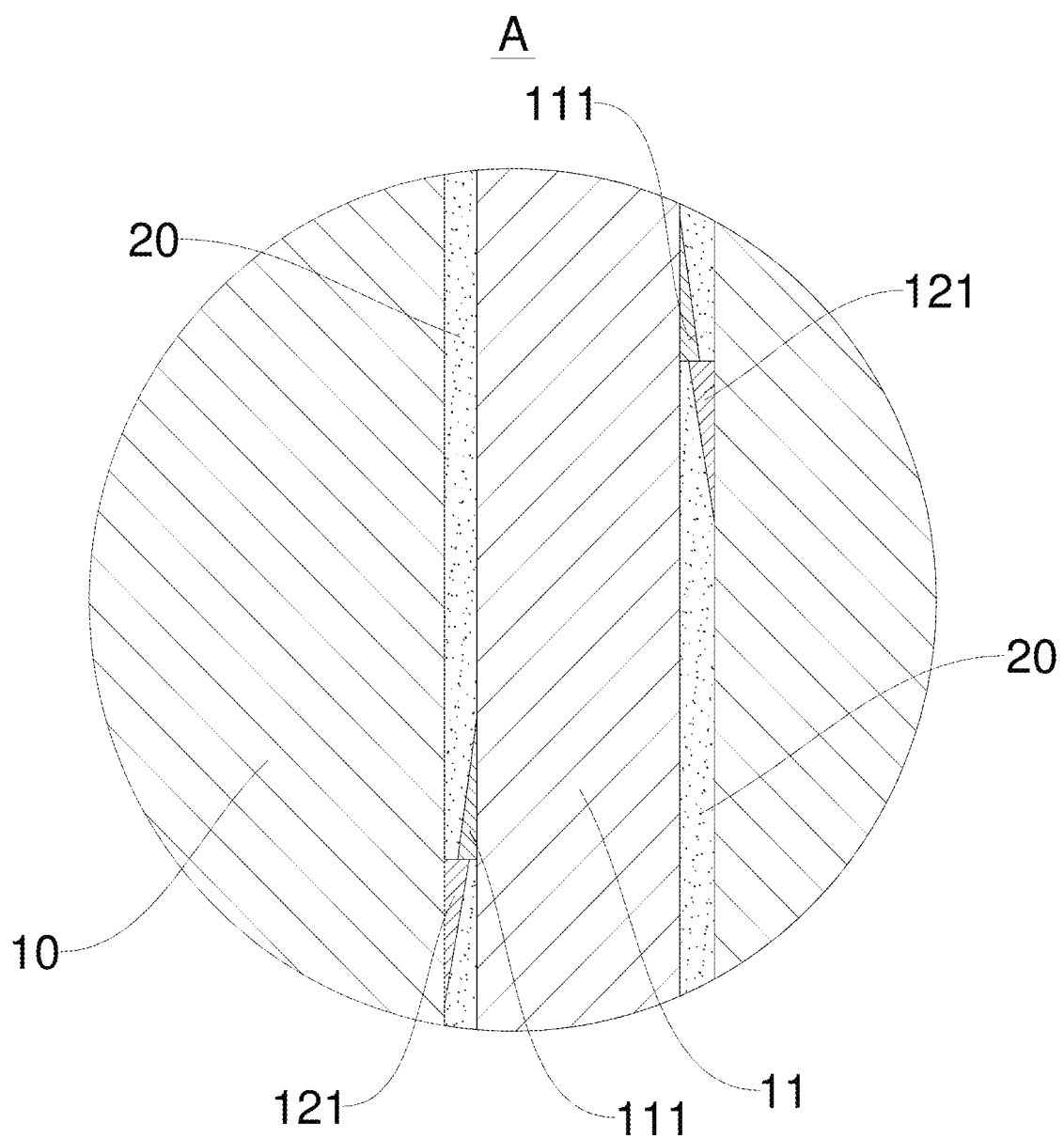
FIG. 3 is an enlarged view of part A in FIG. 2.
Figure 4:
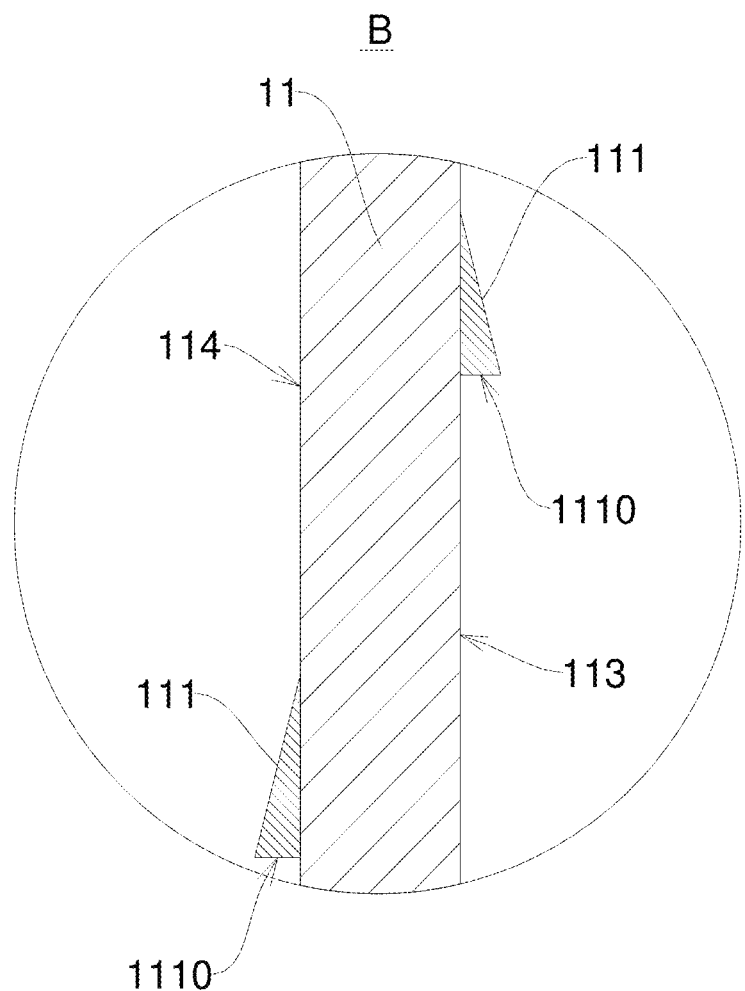
FIG. 4 is an enlarged view of part B in FIG. 2.
Figure 5:
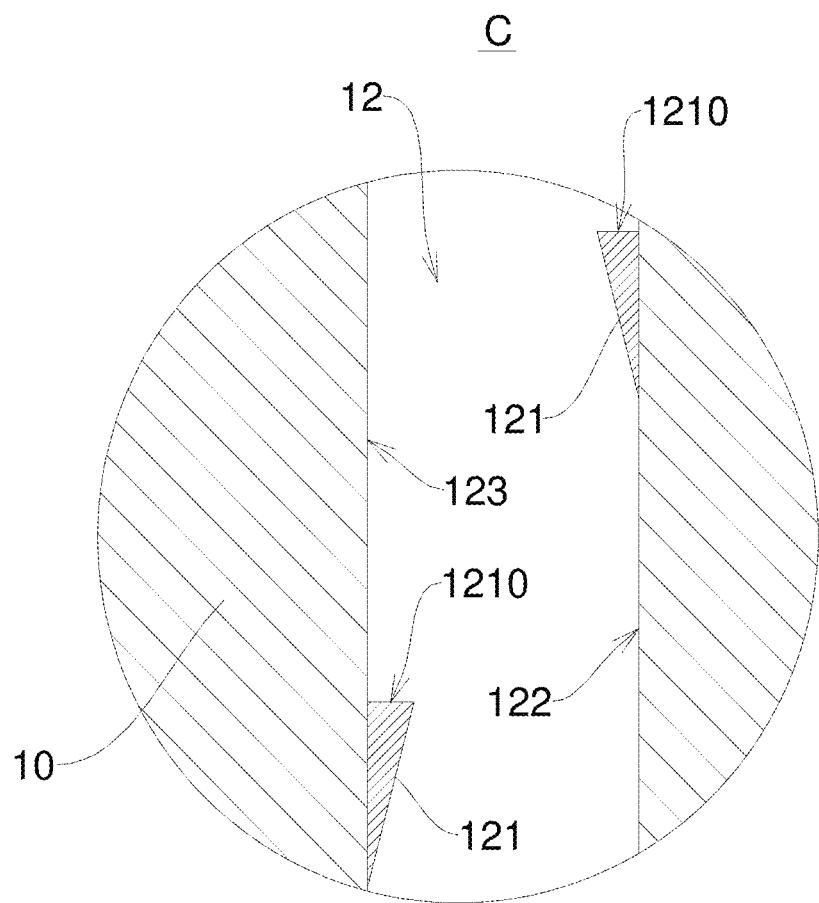
FIG. 5 is an enlarged view of part C in FIG. 2.

Referring to FIGS. 1 to 8, the recyclable cylindrical structure provided by the present disclosure is described below. In an embodiment, as shown in FIGS. 1, 2 and 3, the recyclable cylindrical structure provided by the present disclosure may include a plurality of prefabricated cylindrical units 10 connected sequentially with one on top of the other along the axes R of the prefabricated cylindrical units 10. A ring block 11 is arranged on the top of each prefabricated cylindrical unit 10. The ring block 11 is in a ring shape. The side wall (which may include a first side wall 113 and/or a second side wall 114 as shown in FIG. 4) of the ring block 11 is provided with a plurality of first connection elements 111 which are distributed with space apart and along the circumferential direction of the ring block 11. A ring slot 12 is formed on the bottom of each prefabricated cylindrical unit 10. The ring slot 12 is in a ring shape to match the ring block 11. The inner side wall (which may include a first inner side wall 122 and/or a second inner side wall 123 as shown in FIG. 5) of the ring slot 12 is provided with a plurality of second connection elements 121 which are distributed with space apart and along the circumferential direction of the ring slot 12.

It should be noted that each prefabricated cylindrical unit 10 is a hollow structure, and the cross-section (shown in FIG. 6) and the top view (shown in FIGS. 12 and 14) of each prefabricated cylindrical unit 10 is ring-shaped.

Referring to FIG. 2, for every two adjacent prefabricated cylindrical units 10 of the recyclable cylindrical structure, the ring block 11 of the lower prefabricated cylindrical unit 101 is inserted into the ring slot 12 of the upper prefabricated cylindrical unit 102. And, the first connection elements 111 arranged on the side wall of the ring block 11 of the lower prefabricated cylindrical unit 101 are corresponding and jammed one-to-one with the second connection elements 121 arranged on the side wall of the ring slot 12 formed in the upper prefabricated cylindrical unit 102 to prevent the lower prefabricated cylindrical unit 101 and the upper prefabricated cylindrical unit 102 from moving up and down relative to each other. The gap between the side walls of the ring block 11 and the side walls of the ring slot 12 is grouted. The grouting material may be slurry 20.

It should be note that the topmost prefabricated cylindrical unit 10 of the recyclable cylindrical structure may be provided without the ring block 11. Even though the topmost prefabricated cylindrical unit 10 is provided with the ring block 11, it is not inserted in the ring slot 12 because there is no a prefabricated cylindrical unit 10 that is adjacent to and above the topmost prefabricated cylindrical unit 10. For the bottommost prefabricated cylindrical unit 10 of the recyclable cylindrical structure, a foundation may be provided with a connection structure that can be inserted into the ring slot 12 of the bottommost prefabricated cylindrical unit 10 to fix the recyclable cylindrical structure on ground. The connection structure may be the same or similar to the ring block 11.

In the present embodiment, according to actual demands, prefabricated cylindrical units 10 may be made of reinforced concrete or steel. When the diameter of the recyclable cylindrical structure is great, each prefabricated cylindrical unit 10 may be spliced by several arc-shaped pieces in sequential. Optionally, a ring block 11 may be made of steel. When a prefabricated cylindrical unit 10 is made of reinforced concrete, a ring block 11 may be fixed with the prefabricated cylindrical unit 10 by embedding the bottom of the ring block 11 into the top of the prefabricated cylindrical unit 10. Optionally, a ring block 11 and a prefabricated cylindrical unit 10 may be poured as one-piece by concrete.

Optionally, as the grouting material, slurries 20 may be made of clay. After grouted into the gap between the side walls of a ring block 11 and the inner side walls of the corresponding ring slot 12, slurries 20 solidify. The strength of solidified slurries 20 is low, therefore, when the recyclable cylindrical structure is demolished (i.e., recycled), two adjacent prefabricated cylindrical units 10 can rotate relative to each other by applying a torque to one of the two adjacent prefabricated cylindrical units 10. When two adjacent prefabricated cylindrical units 10 rotate relative to each other, the first connection elements 111 arranged on the ring block 11 of the lower one of the two adjacent prefabricated cylindrical units 10 and the second connection elements 121 arranged in the ring slot 12 of the upper one of the two adjacent prefabricated cylindrical units 10 are circumferentially staggered, that is, each first connection element 111 and a corresponding second connection element 121 are no longer aligned and jammed with each other (i.e., dis-jammed with each other) along the longitudinal direction (i.e., up-down direction) of the recyclable cylindrical structure, thus the two adjacent prefabricated cylindrical units 10 are able to move away from each other along the longitudinal direction of the recyclable cylindrical structure to realize demolition. In addition, slurries 20 are anticorrosive which can prevent ring block 11, especially for ring blocks 11 made of steel (e.g., steel plate), from being corroded because of contacting with air and/or rainwater.

Compared with the prior art, the advantageous effects of the recyclable cylindrical structure provided by the present embodiment are described as follows. The recyclable cylindrical structure is constructed by connecting several prefabricated cylindrical units 10 from bottom to top, where the ring block 11 of a lower prefabricated cylindrical unit 101 is inserted into the ring slot 12 of an upper prefabricated cylindrical unit 102 which is adjacent to the lower prefabricated cylindrical unit 101 and the first connection elements 111 arranged on the ring block 11 of the lower prefabricated cylindrical unit 101 correspond to and are jammed with, one-to-one, the second connection elements 121 arranged in the ring slot 12 of the upper prefabricated cylindrical unit 102, thus two adjacent prefabricated cylindrical units 10 can be connected and fixed reliably with each other. In addition, the gap between the side wall of the ring block 11 and the inner side wall of the ring slot 12 is grouted by slurries 20, thus the connection gap between the two adjacent prefabricated cylindrical units 10 is sealed. In the construction process of the recyclable cylindrical structure, the fabrication of the prefabricated cylinder units 10 and the construction of foundation can be carried out simultaneously, and the installation of the prefabricated cylinder units 10 can be carried out immediately after the foundation construction is completed, thus the construction period is greatly shortened, and the construction efficiency is improved. When the recyclable cylindrical structure needs to be demolished, since the strength of solidified slurries 20 is low, two adjacent prefabricated cylindrical units 10 can rotate relative to each other driven by an external torque to make the first connection elements 111 and the second connection elements 121 be dis-jammed. Then, the upper prefabricated cylindrical unit 102 can be lifted, while the ring block 11 fixed on the top of the lower prefabricated cylindrical unit 101 detaches from the ring slot 12 formed on the bottom of the upper lower prefabricated cylindrical unit 102, to realize demolition. In the demolition process of the recyclable cylindrical structure provided by the present embodiment, there is almost no dust pollution and construction waste. In addition, after being demolished, the prefabricated cylindrical units 10 can be recycled and used again, thus saving construction materials and adapting to the development idea of energy conservation and environmental protection.

In an embodiment, referring to FIGS. 1 and 2, two first sealing rings 30 are arranged on the top of each prefabricated cylindrical unit 10, where the ring block 11 is positioned between the two first sealing rings 30. A second sealing ring 40 is arranged on the top of the ring block 11 of each prefabricated cylindrical unit 10. When an upper prefabricated cylindrical unit 102 is installed on a lower prefabricated cylindrical unit 101, the bottom of the upper prefabricated cylindrical unit 102 is in contact with the two first sealing rings 30 arranged on the top of the lower prefabricated cylindrical unit 101 and the connection gap between the bottom of the upper prefabricated cylindrical unit 102 and the top of the lower prefabricated cylindrical unit 101 is sealed by the two first sealing rings 30, meanwhile the bottom of the ring slot 12 of the upper prefabricated cylindrical unit 102 is in contact with the second sealing ring 40 arranged on the top of the ring block 11 of the lower prefabricated cylindrical unit 101 and the connection gap between the bottom of the ring slot 12 and the top of the ring block 11 is sealed by the second sealing ring 40.

In the present embodiment, connection gaps between two adjacent prefabricated cylindrical units 10 are sealed by arranging first sealing ring 30 and second sealing ring 40, thus preventing the gas in the recyclable cylindrical structure (e.g., a chimney) from outflowing from the connection gaps and preventing rainwater from flowing into the recyclable cylindrical structure from the connection gaps.

In an embodiment, referring FIGS. 3 to 5, as improvements to first connection element 111 and second connection element 121, each first connection element 111 is wedge-shaped with tip up and the bottom of each first connection element 111 is formed as a first plane for jamming 1110, and each second connection element 121 is wedge-shaped with tip down and the top of each second connection element 121 is formed as a second plane for jamming 1210. Each first connection element 111 fixed on the ring block 11 of a lower prefabricated cylindrical unit 10 is above a corresponding second connection element 121 fixed in the ring slot 12 of an adjacent upper prefabricated cylindrical unit 10, and the first plane for jamming 1110 of each first connection element 111 is in contact with the second plane for jamming 1210 of the corresponding second connection element 121, thus that the lower prefabricated cylindrical unit 101 and the upper prefabricated cylindrical unit 102 is kept from moving up and down relative to each other. Further, each first connection element 111 and/or each second connection element 121 has elasticity to radially deform, where radially deform means deforming along the radial direction of the recyclable cylindrical structure.

In the present embodiment, wedge-shape can ensure the first connection elements 111 and second connection elements 121 being jammed reliability to each other. When the ring block 11 of a lower prefabricated cylindrical unit 101 is inserted into the ring slot 12 of an upper prefabricated cylindrical unit 102, each second connection element 121 arranged in the ring slot 12 moves down gradually to approach the corresponding first connection element 111 arranged on the ring block 11. When the second connection element 121 and the corresponding first connection element 111 are in contact with each other, the tilted surface of the second connection element 121 which is wedge-shaped with tip down contacts and squashes the tilted surface of the first connection element 111 which is wedge-shaped with tip up. That is, the tilted surfaces of the first connection element 111 and the second connection element 121 squashes each other, causing the first connection element 111 and/or the second connection element 121 with elasticity to radially shrink and deform. As the height of the second connection element 121 continues to decrease, the radial deformation gradually increases until the height of the first connection element 111 is greater than the height of the second connection element 121, that is, the first connection element 111 is above the second connection element 121. When the first connection element 111 is above the second connection element 121, the two tilted surfaces of the first connection element 111 and the second connection element 121 no longer contacts and squashes each other, the first connection element 111 and/or the second connection element 121 with elasticity returns to its original state by its/their own elasticity, and the first plane for jamming 1110 of the first connection element 111 and the second plane for jamming 1210 of the second connection element 121 is in contact with and block each other, thus the lower prefabricated cylindrical unit 101 and the upper prefabricated cylindrical unit 102 cannot move up and down relative to each other, that is, they are jammed and fixed with each other. In the installing process of the lower prefabricated cylindrical unit 101 and the upper prefabricated cylindrical unit 102 described above, only the moving down of the upper prefabricated cylindrical unit 102 is needed to make the ring block 11 be inserted into the ring slot 12 and realize the jammed and fixed connection, which can improve the installation efficiency of the prefabricated cylindrical units 10 and the construction efficiency of the recyclable cylindrical structure. In addition, because of applying the first connection elements 111 and the second connection elements 121, in the installing process of the prefabricated cylindrical units 10, there is no need to rotate the upper prefabricated cylindrical unit 102 relative to the lower prefabricated cylindrical unit 101, which can prevent the first sealing rings 30 and the second sealing rings 40 from being damaged due to be rubbed by the upper prefabricated cylindrical unit 102 and ensure that the connection gap between the two adjacent prefabricated cylindrical units 10 is reliably sealed.

Figure 7:
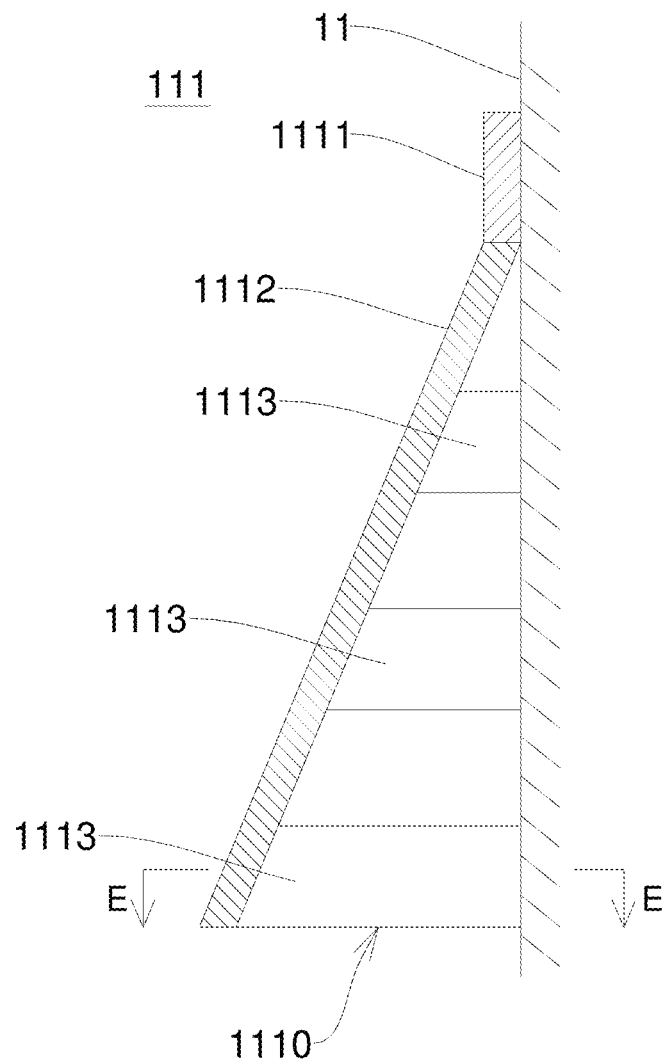
FIG. 7 is a schematic sectional view of a first connection element according to embodiments of the present disclosure.
Figure 8:
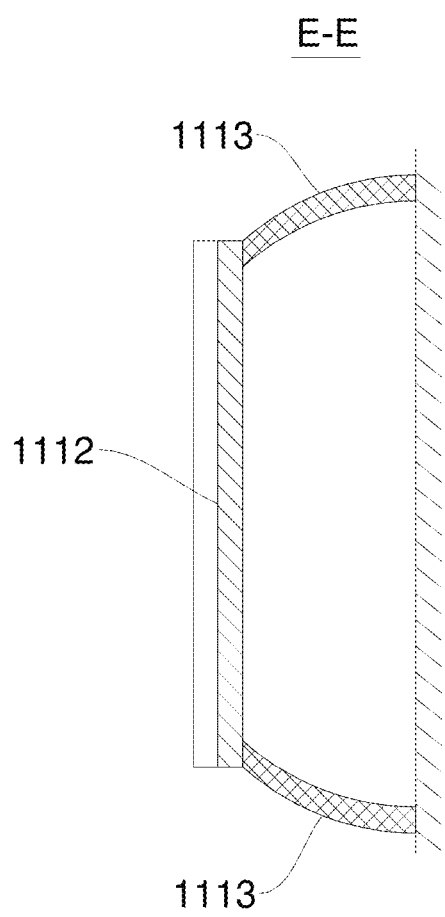
FIG. 8 is a sectional view along a section line E-E in FIG. 7.

In an embodiment, referring to FIGS. 7 and 8, second connection elements 121 arranged in the ring slot 12 of each prefabricated cylindrical unit 10 are rigid wedge-shaped blocks, and first connection elements 111 arranged on the ring block 11 of each prefabricated cylindrical unit 10 are elastic wedge-shaped blocks. Each elastic wedge-shaped block, that is first connection elements 111, includes a position limiting block 1111, a tilted plate 1112 and two groups of elastic arc plates 1113. The position limiting block 1111 is fixed on the side wall of the ring block 11 of each prefabricated cylindrical unit 10. The tilted plate 1112 is connected on the side wall of the ring block 11, where the top of the tilted plate 1112 is in contact the position limiting block 1111 such that the tilted plate 1112 is blocked by the position limiting block 1111 and is not able to move upward, and the bottom of the tilted plate 1112 is away from the side wall of the ring block 11. The two groups of elastic arc plates 1113 are symmetrically distributed at two sides of the tilted plate 1112, where each group of elastic arc plates 1113 includes a plurality of elastic arc plates 1113 distributed with space apart in a longitudinal direction of the plurality of prefabricated cylindrical units 10, each elastic arc plate 1113 is fixedly connected between the tilted plate 1112 and the side wall of the ring block 11 in a direction perpendicular to the longitudinal direction such that the tilted plate 1112 is tiled with respect to the side wall of the ring block 11, and two bottom surfaces of two bottommost elastic arc plates 1113 of the two groups of elastic arc plates 1113 and a bottom surface of the tilted plate 1112 forms the first plane for jamming 1110.

Since ring slot 12 is narrow, it is difficult to fix the second connection elements 121 into the ring slot 12. Therefore, in the present embodiment, second connection elements 121 are rigid blocks, such as metal blocks, which can be fixed in the ring slot 12 of each prefabricated cylindrical unit 10 by pouring. After the prefabricated cylindrical unit 10 is poured, a portion of each rigid wedge-shaped block is embedded in the reinforced concrete of the prefabricated cylindrical unit 10, and the remaining portion of each rigid wedge-shaped block is exposed in the ring slot 12. Since the first connection elements 111 are exposed before installing, they are easy to fix on the ring block 11. Therefore, in the present embodiment, each first connection element 111 may adopt the elastic wedge-shaped structure including the position limiting block 1111, the tilted plate 1112 and the two groups of elastic arc plates 1113. Two groups of elastic arc plates 1113 connect the tilted plate 1112 to the ring block 11 and keep the tilted plate 1112 tilted. The top of the tilted plate 1112 is in contact with the bottom of the position limiting block 1111, thus the tilted plate 1112 is blocked by the position limiting block 1111 and is not able to move upward, especially when the tilted plate 1112 is pushed upward by a second connection element 121 below, to ensure that two adjacent prefabricated cylindrical units 10 cannot move up and down relative to each other after installed.

Based on the structures of first connection element 111 and second connection element 121 provided by the present embodiment, the installing process of two adjacent prefabricated cylindrical units 10 is described as follows. As an upper prefabricated cylindrical unit 102 is gradually lowered, the ring block 11 of a lower prefabricated cylindrical unit 101 is inserted into the ring slot 12 of the upper prefabricated cylindrical unit 10 and the depth of the ring block 11 be inserted into the ring slot 12 is gradually increases. When each second connection element 121 arranged on the ring block 11 and a corresponding first connection element 111 arranged in the ring slot 12 is in contact with each other, the tilted surface of the second connection element 121 contacts and squashes the tilted plate 1112 of the first connection element 111. When the tilted plate 1112 of the first connection element 111 is squashed, the elastic arc plates 1113 of the first connection element 111 are bent and deformed, and the tilted angle of the tilted plate 1112 is reduced, causing the first connection element 111 to radially shrink and deform. As the height of the second connection element 121 continues to decrease, the radial deformation of the first connection element 111 gradually increases until the height of the first connection element 111 is greater than the height of the second connection element 121, that is, the first connection element 111 is above the second connection element 121. When the first connection element 111 is above the second connection element 121, the tilted plate 1112 of the first connection element 111 is no longer squashed by the second connection element 121, the tilted plate 1112 of the first connection element 111 is, by the elasticity of the elastic arc plates 1113, reset and returns to its original state (as shown in FIG. 6) before being squashed, and the first plane for jamming 1110 (formed by two bottom surfaces of two bottommost elastic arc plates 1113 of the two groups of elastic arc plates 1113 and the bottom surface of the tilted plate 1112) of the first connection element 111 and the second plane for jamming 1210 of the second connection element 121 contact and block each other, thus realizing the jammed connection of the first connection element 111 and the second connection element 121, which is sample and reliable and improves installation efficiency.

In the installing process, since it is necessary that each first connection element 111 of a lower prefabricated cylindrical unit 101 is aligned, in the up-down direction, with a corresponding second connection element 121 of an upper prefabricated cylindrical unit 102, a marking line may be arranged on the outer side wall of each prefabricated cylindrical unit 10. Each first connection element 111 can be aligned with its corresponding second connection element 121 in the up-down direction by making, through observing and adjusting, two marking lines of two adjacent prefabricated cylindrical units 10 be aligned in the up-down direction.

Figure 6:
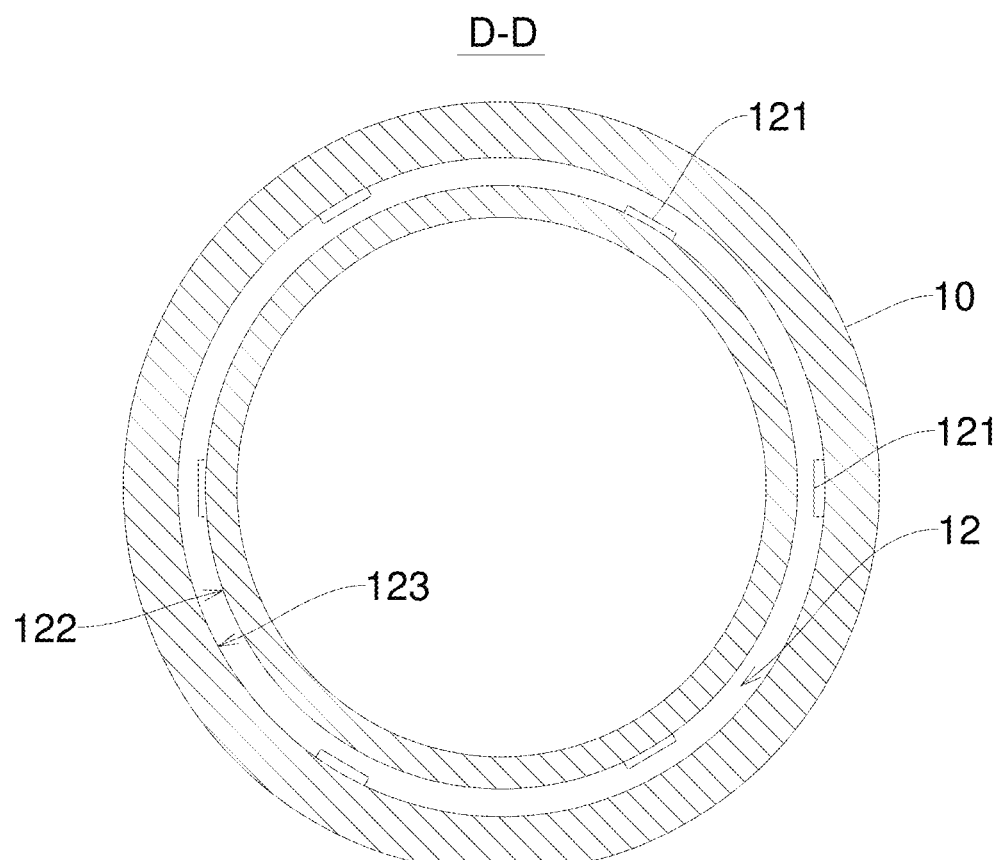
FIG. 6 is a sectional view along a section line D-D in FIG. 2.

In an embodiment, referring to FIGS. 5 and 6, the inner side wall of the ring slot 12 of each prefabricated cylindrical unit 10 includes a first inner side wall 122 and a second inner side wall 123, where the first inner side wall 122 is closer to the axis of each prefabricated cylindrical unit 10 than the second inner side wall 123. The second connection elements 121 arranged in the ring slot 12 of each prefabricated cylindrical unit 10 are distributed on both the first inner side wall 122 and the second inner side wall 123. The second connection elements 121 are distributed with space apart and are staggered around a circumference of the ring slot 12 and in the longitudinal direction of the recyclable cylindrical structure. Any two second connection elements 121 are not aligned in the up-down direction. Since the second connection elements 121 of an upper prefabricated cylindrical unit 102 need to be corresponding, one-to-one, with the first connection element 111 of a lower prefabricated cylindrical unit 101, in the present embodiment, referring to FIG. 4, the ring block 11 of each prefabricated cylindrical unit 10 includes a first side wall 113 and a second side wall 114 and the first connection elements 111 of each prefabricated cylindrical unit 10 are distributed on both the first side wall 113 and the second side wall 114 of the ring block 11, where the first side wall 113 is closer to the axis of each prefabricated cylindrical unit 10 than the second side wall 114. When two adjacent prefabricated cylindrical units 10 are assembled and connected, the first connection elements 111 arranged on the first side wall 113 of the ring block 11 of the lower prefabricated cylindrical unit 101 are jammed, one-to-one, with the second connection elements 121 arranged on the first inner side wall 122 of the ring slot 12 of the upper prefabricated cylindrical unit 102, and similarly, the first connection elements 111 arranged on the second side wall 114 of the ring block 11 are jammed, one-to-one, with the second connection elements 121 arranged on second inner side wall 123 of the ring slot 12, thus the reliability of the connection of two adjacent prefabricated cylindrical units 10 is improved. In addition, the second connection elements 121 are staggered around the circumference of the ring slot 12, therefore the central angles defined by two adjacent second connection elements 121 in the same circle are reduced, which can improve the uniformity of the jammed connection force of two adjacent prefabricated cylindrical units 10 and improve the stability and reliability of two adjacent prefabricated cylindrical units 10.

In an embodiment, referring to FIG. 1, the outer side wall of each prefabricated cylindrical unit 10 is provided with at least two grouting holes 13 that are staggered in the longitudinal direction of the recyclable cylindrical structure and in communication with the ring slot 12 of a corresponding prefabricated cylindrical unit 10. When the gap between the side wall of the ring block 11 of a lower prefabricated cylindrical unit 101 and the inner side wall of the ring slot 12 of an upper prefabricated cylindrical unit 102 is grouted by the slurries 20, to improve grouting effect, the grouting may be performed twice. In the first grouting, slurries 20 are injected through a first grouting hole 13, while the gas in the gap is expelled through a second grouting hole 13 which is farthest from the first grouting hole 13; and the grouting is stopped when slurries 20 flows out from the second grouting hole 13. The second grouting is performed after the slurries 20 injected in the first grouting are solidified. In the second grouting, slurries 20 are injected through the second grouting hole 13, while the gas in the gap is expelled through the first grouting hole 13. To avoid wasting time for waiting the slurries 20 injected in the first grouting to solidify, the second grouting can be performed after all prefabricated cylindrical units 10 are installed. That is, after the first grouting, the installing of the next prefabricated cylindrical unit 10 can be performed instead of waiting the slurries 20 injected in the first grouting to solidify. When the installing of all prefabricated cylindrical units 10 is completed, the slurries 20 injected in the first grouting are solidified and the second grouting of all gaps can be performed from bottom to top or from top to bottom, thus improving the efficiency of construction.

In an embodiment, referring to FIG. 1, the ring block 11 of each prefabricated cylindrical unit 10 is provided with a plurality of groups of circular holes 112. Each group of circular holes 112 includes a plurality of circular holes 112 distributed circumferentially with space apart, and the plurality of groups of circular holes 112 are distributed with space apart in the longitudinal direction of a corresponding prefabricated cylindrical unit 10 and are staggered. Any two circular holes 112 of two adjacent groups of circular holes 112 are not aligned in the up-down direction. When slurries 20 are injected into the gap between the side wall of the ring block 11 of a lower prefabricated cylindrical unit 101 and the inner side wall of the ring slot 12 of an upper prefabricated cylindrical unit 102, the slurries 20 can flow from the outside of the ring block 11 to the inside of the ring block 11 through the circular holes 112, as well as flow from the inside of the ring block 11 to the outside of the ring block 11, where the inside of the ring block 11 is closer to the axis of each prefabricated cylindrical unit 10 than the outside of the ring block 11. That is, the circular holes 112 facilitate the flow of the slurries 20, thus ensuring that the slurries 20 can fully fill the gap to improve grouting effect. It is clear that the gap may include two parts. The first part which is corresponding to the inside of the ring block 11 mentioned above is between the first side wall 113 of the ring block 11 and the first inner side wall 122 of the ring slot 12, and the second part which is corresponding to the outside of the ring block 11 mentioned above is between the second side wall 114 of the ring block 11 and the second inner side wall 123 of the ring slot 12. In addition, the circular holes 112 can reduce the weight of ring block 11, thus facilitating lifting construction and reducing the weight of the recyclable cylindrical structure. The circular holes 112 of two adjacent groups of circular holes 112 are staggered and not aligned in the up-down direction, which can prevent two circular holes 112 from being too close together in the up-down direction and affecting the strength of the ring block 11, thus ensuring the strength and reliability of the connection of two adjacent prefabricated cylindrical units 10.

In an embodiment, referring to FIG. 1, the outer side wall of each prefabricated cylindrical unit 10 is provided with at least one auxiliary element 14 configured to fix a peripheral device for constructing or recycling. Each auxiliary element 14 may be a corbel structure formed by one-piece with each prefabricated cylindrical unit 10, or a steel structure partially embedded inside each prefabricated cylindrical unit 10. In the process of constructing or recycling the recyclable cylindrical structure, the auxiliary elements 14 can facilitate fixing a device (such as lifting frames, hoisting frames, etc.) arranged around the periphery of the recyclable cylindrical structure, thus reducing the difficulty and improving the efficiency of the constructing and recycling.

Based on the same inventive concept, referring to FIGS. 1, 2, 3, 9 and 10, the present disclosure also provides usage methods of the recyclable cylindrical structures provided by the aforementioned embodiments, which include a constructing method and a recycling method.

Figure 9:
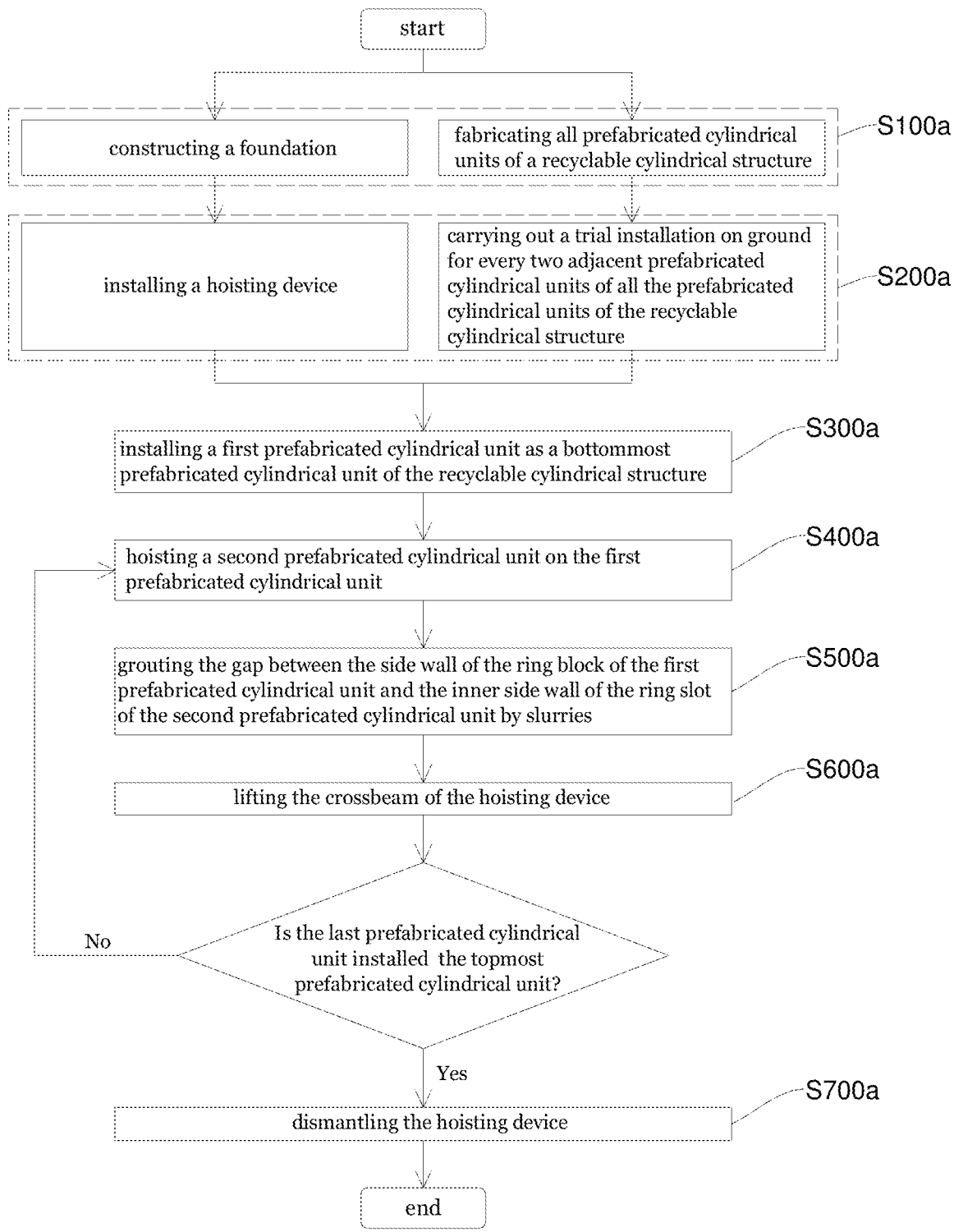
FIG. 9 is a flow diagram of a constructing method of a recyclable cylindrical structure according to embodiments of the present disclosure.

In an embodiment, referring to FIG. 9, the constructing method includes steps S100a to S 700a which are described below.

S100a: simultaneously constructing a foundation and fabricating all prefabricated cylindrical units 10 of a recyclable cylindrical structure.

The foundation may include a connection structure for being inserted into the ring slot 12 formed in the bottom of the bottommost prefabricated cylindrical unit 10 of the recyclable cylindrical structure. The connection structure may be the same or similar to the ring block 11 fixed on the top of each prefabricated cylindrical unit 10, and the connection structure may be provided with first connection elements 111 for being jammed, one-to-one, with the second connection elements 121 arranged in the ring slot 12 of the bottommost prefabricated cylindrical unit 10.

S200a: simultaneously installing a hoisting device and carrying out a trial installation on ground for every two adjacent prefabricated cylindrical units 10 of all the prefabricated cylindrical units 10 of the recyclable cylindrical structure.

When the weight of each prefabricated cylindrical unit 10 is small, the hoisting device may be a tower crane. When the weight of each prefabricated cylindrical unit 10 is large, the hoisting device may include not only a tower crane, but also other equipment to work with the tower crane (that is, the tower crane needs other equipment to cooperate and work together), or the hoisting device may be a specialized equipment for lifting the prefabricated cylindrical units 10 instead of a tower crane. In the present step, the installation of the hoisting device and the trial installation of every two adjacent prefabricated cylindrical units 10 are performed at the same time, which can improve efficiency. The purpose of performing the trial installation is to detect installation problems of each prefabricated cylindrical unit 10 in advance and deal with them before the final installation of each prefabricated cylindrical unit 10, to ensure that the construction of the recyclable cylindrical structure can be carried out smoothly, reduce construction difficulty and improve construction efficiency.

S300a: installing a first prefabricated cylindrical unit 10 as a bottommost prefabricated cylindrical unit 10 of the recyclable cylindrical structure.

After the installation of the first prefabricated cylindrical unit 10 is completed, two gaps should be sealed by grouting. The first gap is between the bottom of the first prefabricated cylindrical unit 10 and the foundation. The second gap is between the connection structure of the foundation and the inner side wall of the ring slot 12 of the first prefabricated cylindrical unit 10.

S400a: hoisting a second prefabricated cylindrical unit 10 on the first prefabricated cylindrical unit 10.

After the second (upper) prefabricated cylindrical unit 102 is hoisted on the first (lower) prefabricated cylindrical unit 101, the ring block 11 of the lower prefabricated cylindrical unit 101 is inserted into the ring slot 12 of the upper prefabricated cylindrical unit 102 and the first connection elements 111 fixed on the side wall of the ring block 11 of the lower prefabricated cylindrical unit 101 are jammed, one-to-one, with the second connection elements 121 fixed on the inner side wall of the ring slot 12 of the upper prefabricated cylindrical unit 102.

In S400a, since the trial installation of every two adjacent prefabricated cylindrical units 10 has already been performed on ground in S200a, when the upper prefabricated cylindrical unit 102 is lowered by the hoisting device, the second connection elements 121 arranged in the ring slot 12 of the upper prefabricated cylindrical unit 102 can be jammed successfully, by the gravity of the upper prefabricated cylindrical unit 102, one-to-one, with the first connection elements 111 arranged on the ring block 11 of the lower prefabricated cylindrical unit 101. If necessary, people may appropriately assist in the lowering process of the upper prefabricated cylindrical unit 102, such as slightly shaking the upper prefabricated cylindrical unit 102 before it is fixed.

S500a: grouting the gap between the side wall of the ring block 11 of the first prefabricated cylindrical unit 101 and the inner side wall of the ring slot 12 of the second prefabricated cylindrical unit 102 by slurries 20.

As mentioned above, the gap may include two parts. The first part is between the first side wall 113 of the ring block 11 and the first inner side wall 122 of the ring slot 12, and the second part is between the second side wall 114 of the ring block 11 and the second inner side wall 123 of the ring slot 12. As mentioned above, to improve the sealing effect of the grouting, the grouting in S500a may be performed twice. After the slurries 20 has been grouted in a first grouting through one grouting hole 13, a second grouting is performed through another grouting hole 13, to fully fill the gap and improve the sealing and the connection reliability.

Optionally, as mentioned above, the first grouting may be performed in the installation process of each prefabricated cylindrical unit 10, and the second grouting may be performed after the installation of all the prefabricated cylindrical units 10 has been completed. The second grouting is performed after the installation of all the prefabricated cylindrical units 10 has been completed instead of after the first grouting, which can avoid prolonging construction time and slowing down construction progress due to wait the slurries 20 injected in the first grouting to solidify.

S600a: lifting the crossbeam of the hoisting device and repeating steps S400a and S500a until a last prefabricated cylindrical unit 10 is installed as the topmost prefabricated cylindrical unit 10 of the recyclable cylindrical structure.

The lifting height of the crossbeam of the hoisting device may be the height of the next prefabricated cylindrical unit 10 to be hoisted and installed.

S700a: dismantling the hoisting device.

Figure 10:
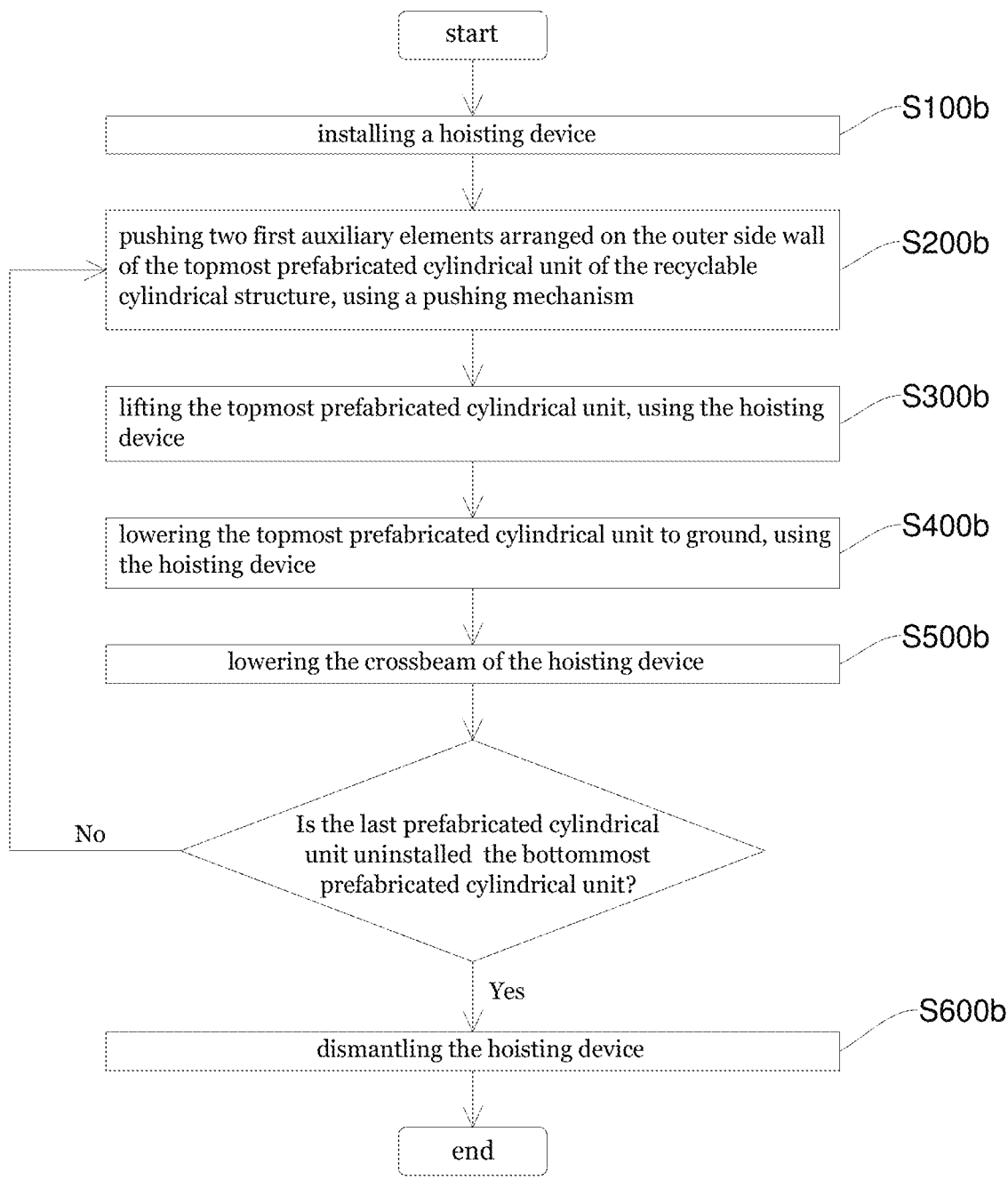
FIG. 10 is a flow diagram of a recycling method of a recyclable cylindrical structure according to embodiments of the present disclosure.

In an embodiment, referring to FIG. 10, the recycling method includes steps S100b to S 600b which are described below.

S100b: installing a hoisting device.

The hoisting device used in the constructing method and the hoisting device used in the recycling method may be the same or not.

S200b: pushing two first auxiliary elements 14 arranged on the outer side wall of the topmost prefabricated cylindrical unit 10 of the recyclable cylindrical structure, using a pushing mechanism 51.

When the topmost prefabricated cylindrical unit 10 is pushed by the pushing mechanism 51, it is driven to horizontally rotate relative to a third (lower) prefabricated cylindrical unit 10 of the recyclable cylindrical structure that is adjacent to and below the topmost prefabricated cylindrical unit 10, such that the first connection elements 111 fixed on the side wall of the ring block 11 of the lower prefabricated cylindrical unit 10 is dis-jammed, one-to-one, with the second connection elements 121 fixed on the inner side wall of the ring slot 12 of the topmost prefabricated cylindrical unit 10.

Figure 14:
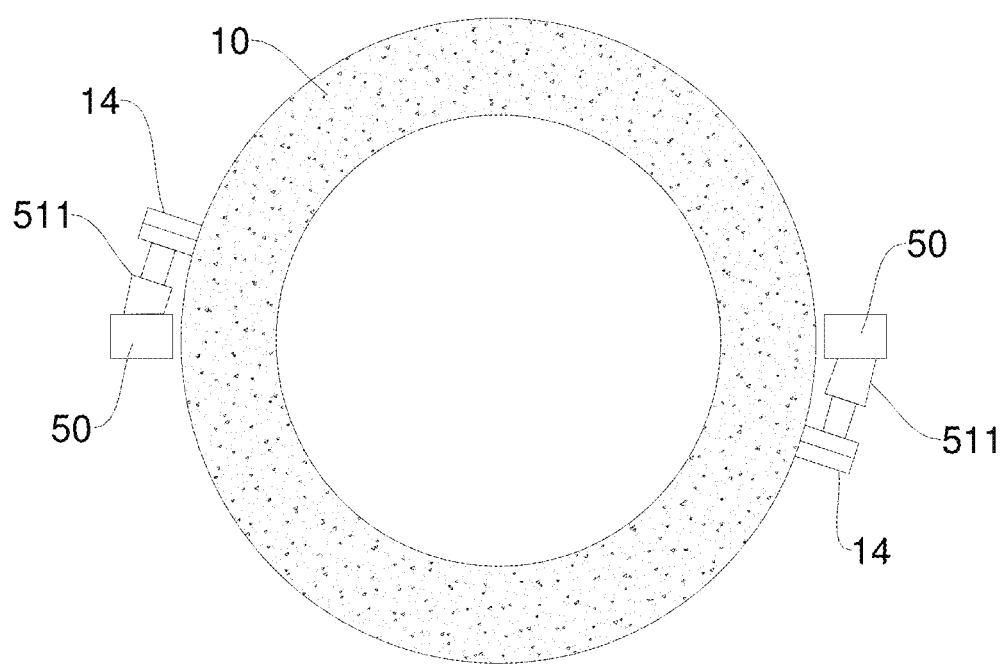
FIG. 14 is a schematic top view showing how to use a pushing mechanism including multiple jacks to push a prefabricated cylindrical unit of the recyclable cylindrical structure according to embodiments of the present disclosure.

Pushing mechanism 51 may include at least two jacks 511 distributed along a same circle, where each jack 511 pushes an auxiliary element 14, as shown FIG. 14. All the jacks 511 push the auxiliary elements 14 along the same circumferential direction (that is, clockwise or counter-clockwise) to drive an upper prefabricated cylindrical unit 102 to horizontally rotate relative to a lower prefabricated cylindrical unit 101 and to make each first connection element 111 of the lower prefabricated cylindrical unit 101 be staggered circumferentially (that is, not aligned in the up-down direction) with the corresponding second connection element 121 of the upper prefabricated cylindrical unit 102. When a first connection element 111 is staggered circumferentially with the corresponding second connection element 121, they are dis-jammed (that is, no longer jammed).

S300b: lifting the topmost prefabricated cylindrical unit 10, using the hoisting device.

When the topmost prefabricated cylindrical unit 10 is lifted, the ring block 11 fixed on the lower prefabricated cylindrical unit 10 is detached from the ring slot 12 formed in the topmost prefabricated cylindrical unit 10.

S400b: lowering the topmost prefabricated cylindrical unit 10 to ground, using the hoisting device.

S500b: lowering the crossbeam of the hoisting device and repeating steps S200b, S300b and S400b until the bottommost prefabricated cylindrical unit 10 of the recyclable cylindrical structure is uninstalled from the foundation.

The lowering height of the crossbeam of the hoisting device may be the height of the prefabricated cylindrical unit 10 that has just been uninstalled.

S600b: dismantling the hoisting device.

Compared with the prior art, the advantageous effects of the usage methods of the recyclable cylindrical structures are as follows. By performing the usage methods which include the constructing method and the recycling method, the construction period of the recyclable cylindrical structure is short, the construction efficiency is high, the demolition of the recyclable cylindrical structure almost does not produce dust pollution and construction waste, and the prefabricated cylindrical units 10 can be recycled and used again, thus saving construction materials and adapting to the development idea of energy conservation and environmental protection.

In an embodiment, referring to FIGS. 11 to 15, the hoisting device used in the constructing method and the recycling method includes two support columns 50, a crossbeam 60, a windlass 70, a rail 80 and two lift drive assemblies 90.

The two support columns 50 are detachably connected with two second auxiliary elements 14, respectively, arranged on the outer side wall of a fourth prefabricated cylindrical unit 10. The two second auxiliary elements 14 are opposite to each other, such that the fourth prefabricated cylindrical unit 10 is positioned between the two support columns 50, that is, the two support columns 50 are symmetrically distributed at two sides of the fourth prefabricated cylindrical units 10.

Figure 11:
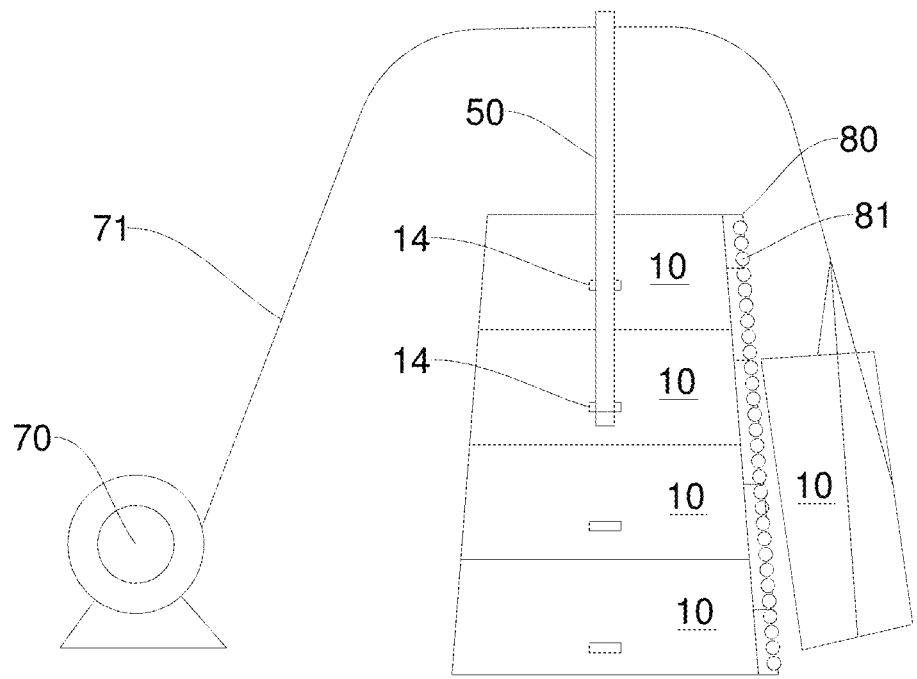
FIG. 11 is a first schematic side view showing how to use a hoisting device to construct and recycle a recyclable cylindrical structure according to embodiments of the present disclosure.

It is noted that, in the constructing method, the fourth prefabricated cylindrical unit 10 is the current topmost prefabricated cylindrical unit 10 of the recyclable cylindrical structure being constructed. Optionally, in order to ensure that the two support columns 50 are stable, as shown in FIG. 11, each support column 50 can be connected with two topmost prefabricated cylindrical units 10 through connecting the auxiliary elements 14. When installing the bottommost prefabricated cylindrical unit 10 of the recyclable cylindrical structure on ground, a crane may be used to hoist the bottommost prefabricated cylindrical unit 10 instead of the hoisting device; or, the two support columns 50 can be fixed on ground because there is no prefabricated cylindrical unit 10 for the two support columns 50 to be fixed on. In the recycling method, the fourth prefabricated cylindrical unit 10 is a prefabricated cylindrical unit 10 that is adjacent to and below the current topmost prefabricated cylindrical unit 10 of the recyclable cylindrical structure being demolished, because the current topmost prefabricated cylindrical unit 10 is the prefabricated cylindrical unit 10 to be uninstalled and it cannot be used to fix the two support columns 50.

Two ends of the crossbeam 60 are detachably connected with two top ends of the two support columns 50, respectively. The crossbeam 60 is provided with at least two pull rods 61 each being positioned at an angle with the crossbeam 60. Each pull rod 61 is detachably connected with at least one corresponding auxiliary element 14 arranged on the fourth prefabricated cylindrical unit 10. A pulley 62 is hanged at the middle of the crossbeam 60.

The pull rods 61 are at least used to strengthen the connection between the two support columns 50 and the fourth prefabricated cylindrical unit 10 to keep the hoisting device stable.

The windlass 70 is fixed on ground and is located at a first side of the crossbeam 60. The overhanging end of the rope 71 of the windlass 70 is located at a second side of the crossbeam 60 opposite the first side, after the rope 71 is looped over the wheel of the pulley 62. The overhanging end of the rope 71 is configured to be connected with a prefabricated cylindrical unit 10 to be installed or uninstalled of all the prefabricated cylindrical units 10.

The rail 80 extends upward along the outer side wall of the recyclable cylindrical structure being constructed or being demolished. The rail 80 may be fixed through the auxiliary elements 14. The rail 80 is provided with a plurality of rubber rollers 81 distributed along the rail 80 and with space apart. The rubber rollers 81 are configured to roll and support the prefabricated cylindrical unit 10 to be installed (when the recyclable cylindrical structure is being constructed) or the prefabricated cylindrical unit 10 that has just been uninstalled (when the recyclable cylindrical structure is being demolished).

The two lift drive assemblies 90 are configured to drive the crossbeam 60 and the two support columns 50 to move up and down. A vertical axis of each lift drive assemblies 90 may be is parallel to the vertical axis of the recyclable cylindrical structure. The bottom of each lift drive assemblies 90 is configured to be detachably connected with the ring block 11 fixed on the current topmost prefabricated cylindrical unit 10 and the top of each lift drive assemblies 90 is configured to be detachably connected with the crossbeam 60.

In the present embodiment, each support column 50 can be detachably connected with the auxiliary elements 14 arranged on at least one current topmost prefabricated cylindrical unit 10. Therefore, the hoisting device can be raised as the height of the recyclable cylindrical structure being constructed increase, and can be lowered as the height of the recyclable cylindrical structure being demolished decrease. It is easy to understand that the auxiliary elements 14 arranged on different prefabricated cylindrical units 10 and used to fix the same support column 50 should be aligned along the direction that the support column 50 extending. The detachable connection between the support column 50 and the auxiliary elements 14 should be able to ensure the connection strength and stability of the support columns 50, which may be threaded connection, inserting connection or jamming connection. Each support column 50 may be provided with fixing bases which are configured to fix pushing mechanisms 51 (such as jacks). The recyclable cylindrical structure (such as chimney) may vary in diameter, that is, the diameter of the recyclable cylindrical structure varies with the height of the recyclable cylindrical structure. The recyclable cylindrical structure (such as structure for storing) also may not vary in diameter, that is, the diameter of different parts of the recyclable cylindrical structure is the same and does not vary with the height of the recyclable cylindrical structure. When the recyclable cylindrical structure varies in diameter, the horizontal distance between two support columns 50 decreases as the height increases, therefore, support column 50 is inclined rather than perpendicular to ground. In this case, the connection position of the crossbeam 60 and the top of each support column 50 need to be changeable and adjustable along the crossbeam 60, which may be realized by arranging multiple connection holes along the crossbeam 60, through each of which the top of each support column 50 can be detachably connected (may be by fasteners) with the crossbeam 60, or by arranging two clamping plates at the top of each support column 50, which can clamp the crossbeam 60 when strained by fasteners. Whether by arranging the multiple connection holes or the two clamping plates, the purpose is to realize the detachable connection of the top of each support column 50 and the crossbeam 60, thus further realizing the changing and adjusting of the connection position.

In the present embodiment, referring to FIG. 11, the process of hoisting a prefabricated cylindrical unit 10 which is on ground using the hoisting device is described as follows. Firstly, connect the overhanging end of the rope 71 of the windlass 70 with the prefabricated cylindrical unit 10 which is on ground and to be installed. Secondly, start the windlass 70 to pull the prefabricated cylindrical unit 10 to move up along the rail 80. The rail 80 is provided with multiple rubber rollers 81 distributed along the rail 80 and the rubber rollers 81 can roll and support the prefabricated cylindrical unit 10, therefore, the friction and resistance experienced by the prefabricated cylindrical unit 10 is small during its ascent, which can prevent the prefabricated cylindrical unit 10 from being damaged due to excessive friction and reduce hoisting difficulty.

Figure 15:
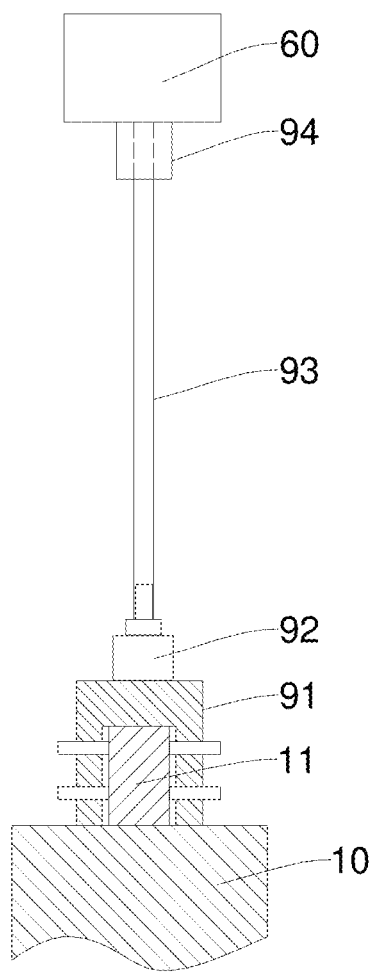
FIG. 15 is a schematic view of the structure of a lift drive assembly according to embodiments of the present disclosure.

In an embodiment, referring to FIG. 15, each lift drive assembly 90 may include a clutching base 91, a hydraulic jack 92, a column for transmitting force 93 and a threaded sleeve 94. The clutching base 91 is used to be detachably connected with the ring slot 11 of the current topmost prefabricated cylindrical unit 10. The hydraulic jack 92 is fixed on the clutching base 91. The bottom of the column for transmitting force 93 is connected with the output end of the hydraulic jack 92. The top of the column for transmitting force 93 is rotatably connected with the threaded sleeve 94. The threaded sleeve 94 is used to fixedly connected with the crossbeam 60.

In the present embodiment, the process of driving, using the lift drive assemblies 90, the crossbeam 60 and two support columns 50 to move up and down is described as follows. Firstly, when the crossbeam 60 needs to be lifted in the constructing process of the recyclable cylindrical structure, fix two clutching bases 91 of two lift drive assemblies 90 on the ring block 11 of the current topmost prefabricated cylindrical unit 10. Secondly, connect the ends of two columns for transmitting force 93 with two threaded sleeves 94 and two hydraulic jacks 92, respectively. Thirdly, after disconnecting two support columns 50 and auxiliary elements 14, lift the crossbeam 60, using two hydraulic jacks 92, to the height for installing the next prefabricated cylindrical unit 10. Fourthly, reconnect two support columns 50 with auxiliary elements 14 which are now close to two support columns 50. Fifthly, remove the two lift drive assemblies 90 to perform installing of next prefabricated cylindrical unit 10. Similarly, when the crossbeam 60 needs to be lowered in the demolishing process of the recyclable cylindrical structure, firstly, fix two clutching bases 91 on the ring block 11 of the current topmost prefabricated cylindrical unit 10 to be demolished. Secondly, connect the ends of two columns for transmitting force 93 with the threaded sleeves 94 and the hydraulic jacks 92, respectively. Thirdly, after disconnecting two support columns 50 and auxiliary elements 14, lower the crossbeam 60, using the hydraulic jack 92, to the height for demolishing the current topmost prefabricated cylindrical unit 10. Fourthly, reconnect two support columns 50 with auxiliary elements 14 which are now close to two support columns 50. Fifthly, remove the two lift drive assemblies 90 to perform demolishing of the current topmost prefabricated cylindrical unit 10.

Figure 12:
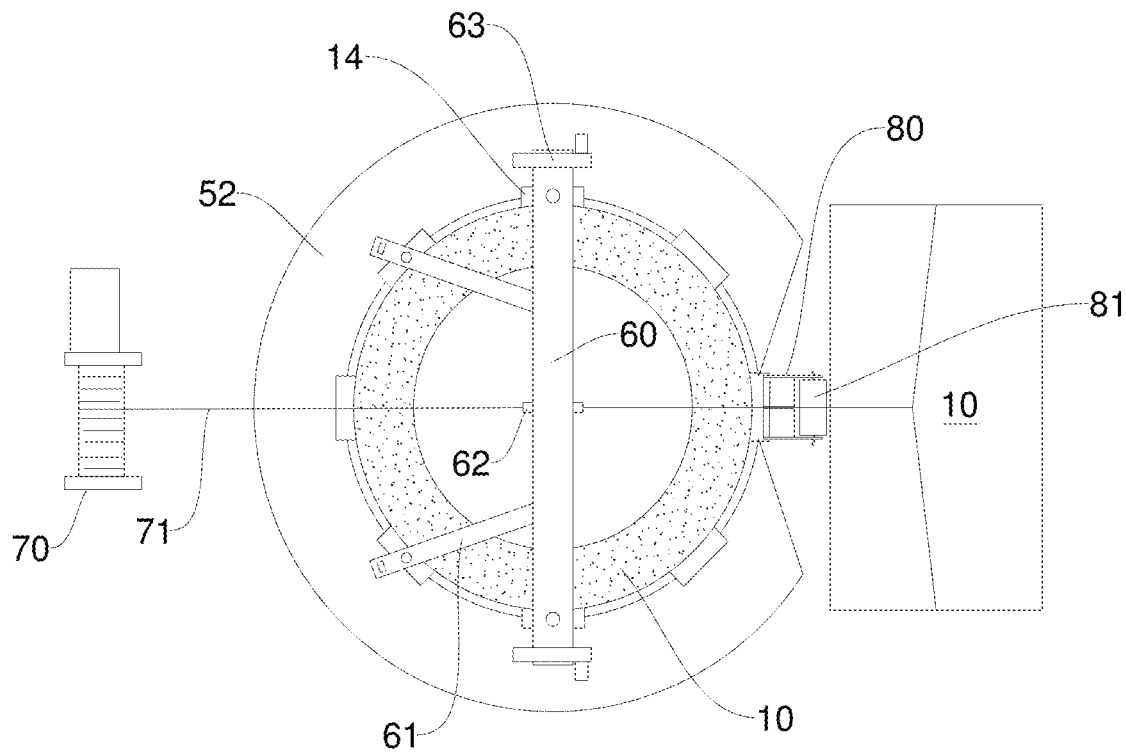
FIG. 12 is a schematic top view showing how to use a hoisting device to construct and recycle a recyclable cylindrical structure according to embodiments of the present disclosure.
Figure 13:
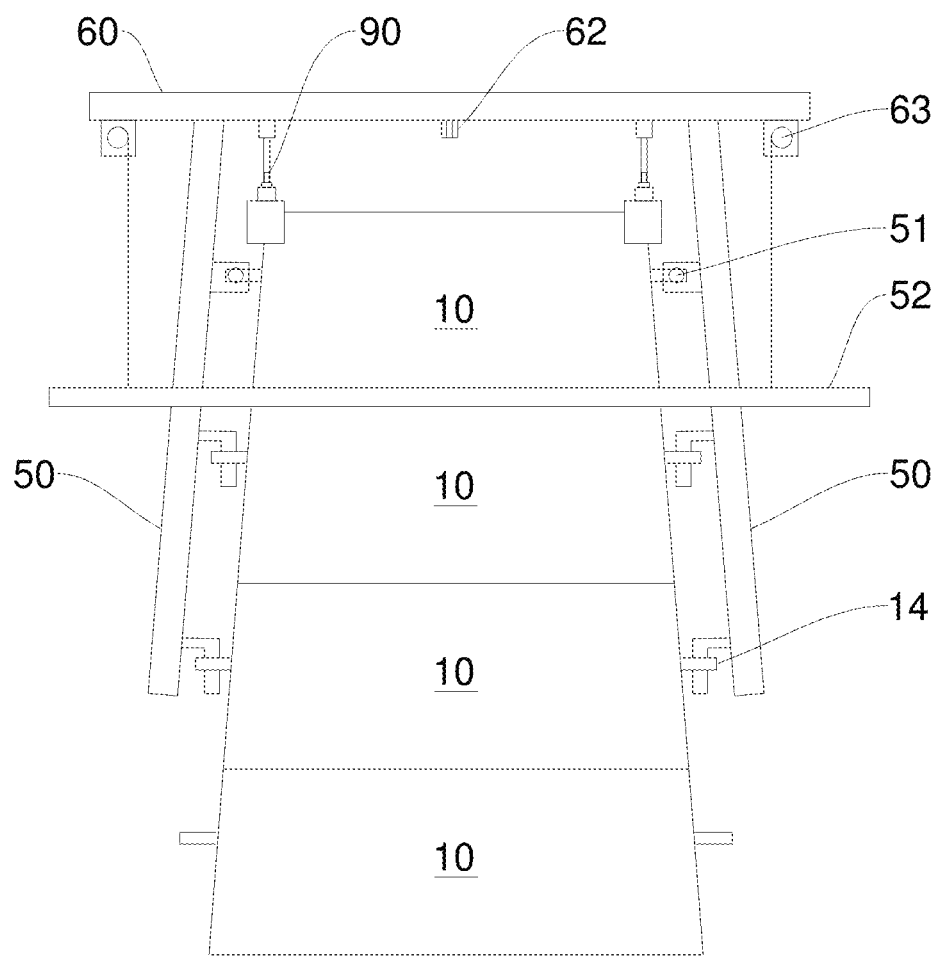
FIG. 13 is a second schematic side view showing how to use a hoisting device to construct and recycle a recyclable cylindrical structure according to embodiments of the present disclosure.

In an embodiment, referring to FIGS. 12 and 13, the hoisting device may include an operating platform 52 surrounding the recyclable cylindrical structure being constructed or demolished. The two ends of the crossbeam 60 can be respectively provided with two electric hoists 63. Two hanging ends of wire ropes of the two electric hoists 63 are respectively connected to the operating platform 52. The operating platform 52 may be detachably connected to the two support columns 50. The operating platform 52 may be used to carry operators. In the process of constructing and demolishing of the recyclable cylindrical structure, the two electric hoists 63 can be used to drive the operating platform 52 to move up and down.

The above descriptions are only preferred embodiments of the present disclosure, and are not intended to limit the present disclosure. Any modifications, equivalent replacements and improvements made within the spirit and principle of the present disclosure shall be included within the protection scope of the present disclosure.

The invention claimed is:
1. A recyclable cylindrical structure comprising a plurality of prefabricated cylindrical units connected with one on top of the other along axes of the plurality of prefabricated cylindrical units, wherein each prefabricated cylindrical unit of the plurality of prefabricated cylindrical units is provided with:
  a ring block coaxially fixed on a top of a corresponding prefabricated cylindrical unit;
  a plurality of first connection elements circumferentially fixed on a side wall of the ring block, wherein each first connection element of the plurality of first connection elements is wedge-shaped with tip up, and a bottom of each first connection element is formed as a first plane for jamming;

a ring slot coaxially formed on a bottom of the corresponding prefabricated cylindrical unit;

a plurality of second connection elements circumferentially fixed on an inner side wall of the ring slot, wherein each second connection element of the plurality of second connection elements is wedge-shaped with tip down, a top of each second connection element is formed as a second plane for jamming, and each first connection element and/or each second connection element has an elasticity to radially deform;

two first sealing rings arranged on the top of the corresponding prefabricated cylindrical unit, with the ring block positioned between the two first sealing rings; and a second sealing ring arranged on a top of the ring block; and wherein:

the ring block of a first prefabricated cylindrical unit is inserted into the ring slot of a second prefabricated cylindrical unit that is adjacent and on top of the first prefabricated cylindrical unit;

the plurality of first connection elements fixed on the side wall of the ring block of the first prefabricated cylindrical unit correspond to and are jammed with, one-to-one, the plurality of second connection elements fixed on the inner side wall of the ring slot formed in the second prefabricated cylindrical unit;

each first connection element of the plurality of first connection elements fixed on the side wall of the ring block of the first prefabricated cylindrical unit is above a corresponding second connection element of the plurality of second connection elements fixed on the inner side wall of the ring slot of the second prefabricated cylindrical unit;

the first plane for jamming of each first connection element of the first prefabricated cylindrical unit is in contact with the second plane for jamming of the corresponding second connection element of the second prefabricated cylindrical unit, such that the first prefabricated cylindrical unit and the second prefabricated cylindrical unit are kept from moving up and down relative to each other;

a gap between the side wall of the ring block of the first prefabricated cylindrical unit and the inner side wall of the ring slot of the second prefabricated cylindrical unit is grouted by slurries;

the two first sealing rings arranged on the top of the first prefabricated cylindrical unit are in contact with a bottom of the second prefabricated cylindrical unit; and the second sealing ring arranged on the top of the ring block fixed on the first prefabricated cylindrical unit is in contact with a bottom of the ring slot formed in the second prefabricated cylindrical unit.

2. The recyclable cylindrical structure of claim 1, wherein each second connection element of the plurality of second connection elements is a rigid wedge-shaped block, each first connection element of the plurality of first connection elements is an elastic wedge-shaped block, and the elastic wedge-shaped block comprising:

a position limiting block fixed on the side wall of the ring block;

a tilted plate connected to the side wall of the ring block, wherein a top of the tilted plate is in contact with the position limiting block such that the tilted plate is blocked by the position limiting block and is not able to move upward, and a bottom of the tilted plate is away from the side wall of the ring block; and two groups of elastic arc plates symmetrically distributed at two sides of the tilted plate, wherein each group of elastic arc plates comprises a plurality of elastic arc plates distributed with space apart in a longitudinal direction of the plurality of prefabricated cylindrical units, each elastic arc plate is fixedly connected between the tilted plate and the side wall of the ring block in a direction perpendicular to the longitudinal direction such that the tilted plate is tilted with respect to the side wall of the ring block, and two bottom surfaces of two bottommost elastic arc plates of the two groups of elastic arc plates and a bottom surface of the tilted plate forms the first plane for jamming.

3. The recyclable cylindrical structure of claim 2, wherein an outer side wall of each prefabricated cylindrical unit is provided with at least one auxiliary element configured to fix a peripheral device for constructing or recycling.

4. The recyclable cylindrical structure of claim 1, wherein the inner side wall of the ring slot of each prefabricated cylindrical unit comprises a first inner side wall and a second inner side wall, the plurality of second connection elements are distributed on both the first inner side wall and the second inner side wall, and the plurality of second connection elements are distributed with space apart and are staggered around a circumference of the ring slot and in a longitudinal direction of the plurality of prefabricated cylindrical units.

5. The recyclable cylindrical structure of claim 4, wherein an outer side wall of each prefabricated cylindrical unit is provided with at least one auxiliary element configured to fix a peripheral device for constructing or recycling.

6. The recyclable cylindrical structure of claim 1, wherein an outer side wall of each prefabricated cylindrical unit is provided with at least two grouting holes that are staggered in a longitudinal direction of the plurality of prefabricated cylindrical units and in communication with the ring slot of a corresponding prefabricated cylindrical unit.

7. The recyclable cylindrical structure of claim 6, wherein the outer side wall of each prefabricated cylindrical unit is provided with at least one auxiliary element configured to fix a peripheral device for constructing or recycling.

8. The recyclable cylindrical structure of claim 1, wherein the ring block of each prefabricated cylindrical unit is provided with a plurality of groups of circular holes, each group of the plurality of groups of circular holes comprises a plurality of circular holes distributed circumferentially with space apart, and the plurality of groups of circular holes are distributed with space apart in a longitudinal direction of a corresponding prefabricated cylindrical unit and are staggered.

9. The recyclable cylindrical structure of claim 8, wherein an outer side wall of each prefabricated cylindrical unit is provided with at least one auxiliary element configured to fix a peripheral device for constructing or recycling.

10. The recyclable cylindrical structure of claim 1, wherein an outer side wall of each prefabricated cylindrical unit is provided with at least one auxiliary element configured to fix a peripheral device for constructing or recycling.

11. A usage method of a recyclable cylindrical structure comprising a plurality of prefabricated cylindrical units, wherein the usage method comprises a constructing method and a recycling method, and each prefabricated cylindrical unit of the plurality of prefabricated cylindrical units is provided with:

a ring block coaxially fixed on a top of a corresponding prefabricated cylindrical unit;

a plurality of first connection elements circumferentially fixed on a side wall of the ring block, wherein each first connection element of the plurality of first connection elements is wedge-shaped with tip up, and a bottom of each first connection element is formed as a first plane for jamming;

a ring slot coaxially formed on a bottom of the corresponding prefabricated cylindrical unit;

a plurality of second connection elements circumferentially fixed on an inner side wall of the ring slot, wherein each second connection element of the plurality of second connection elements is wedge-shaped with tip down, a top of each second connection element is formed as a second plane for jamming and each first connection element and/or each second connection element has an elasticity to radially deform;

two first sealing rings arranged on the top of the corresponding prefabricated cylindrical unit, with the ring block positioned between the two first sealing rings;

a second sealing ring arranged on a top of the ring block; and a plurality of auxiliary elements arranged on an outer side wall of the corresponding prefabricated cylindrical unit; and wherein:

the constructing method comprises:

S100a: simultaneously constructing a foundation and fabricating the plurality of prefabricated cylindrical units;

S200a: simultaneously installing a first hoisting device and carrying out a trial installation on ground for every two adjacent prefabricated cylindrical units of the plurality of prefabricated cylindrical units;

S300a: installing a first prefabricated cylindrical unit on the foundation as a bottommost prefabricated cylindrical unit of the recyclable cylindrical structure;

S400a: hoisting a second prefabricated cylindrical unit on the first prefabricated cylindrical unit to cause the ring block of the first prefabricated cylindrical unit to be inserted into the ring slot of the second prefabricated cylindrical unit, to cause the plurality of first connection elements fixed on the side wall of the ring block of the first prefabricated cylindrical unit to be jammed with, one-to-one, the plurality of second connection elements fixed on the inner side wall of the ring slot of the second prefabricated cylindrical unit, and to simultaneously cause the two first sealing rings arranged on the top of the first prefabricated cylindrical unit to be in contact with the bottom of the second prefabricated cylindrical unit and cause the second sealing ring arranged on the top of the ring block fixed on the first prefabricated cylindrical unit to be in contact with a bottom of the ring slot formed in the second prefabricated cylindrical unit;

S500a: grouting a gap between the side wall of the ring block of the first prefabricated cylindrical unit and the inner side wall of the ring slot of the second prefabricated cylindrical unit by slurries;

S600a: lifting a crossbeam of the first hoisting device and repeating steps S400a and S500a until a last prefabricated cylindrical unit of the plurality of prefabricated cylindrical units is installed as a topmost prefabricated cylindrical unit of the recyclable cylindrical structure; and S700a: dismantling the first hoisting device; and the recycling method comprises:

S100b: installing a second hoisting device;

S200b: pushing first two auxiliary elements of the plurality of auxiliary elements arranged on the outer side wall of the topmost prefabricated cylindrical unit, using a pushing mechanism arranged on the second hoisting device, to drive the topmost prefabricated cylindrical unit to horizontally rotate relative to a third prefabricated cylindrical unit that is adjacent to and below the topmost prefabricated cylindrical unit, such that the plurality of first connection elements fixed on the side wall of the ring block of the third prefabricated cylindrical unit are dis-jammed with, one-to-one, the plurality of second connection elements fixed on the inner side wall of the ring slot of the topmost prefabricated cylindrical unit;

S300b: lifting the topmost prefabricated cylindrical unit, using the second hoisting device, to cause the ring block of the third prefabricated cylindrical unit to be detached from the ring slot of the topmost prefabricated cylindrical unit;

S400b: lowering the topmost prefabricated cylindrical unit to ground, using the second hoisting device;

S500b: lowering a crossbeam of the second hoisting device and repeating steps S200b, S300b and S400b until the bottommost prefabricated cylindrical unit is uninstalled from the foundation; and S600b: dismantling the second hoisting device.

12. The usage method of claim 11, wherein the first hoisting device comprises:

two support columns detachably connectable with second two auxiliary elements, respectively, of the plurality of auxiliary elements arranged on the outer side wall of a fourth prefabricated cylindrical unit, wherein the fourth prefabricated cylindrical unit is a current topmost prefabricated cylindrical unit of the recyclable cylindrical structure being constructed, and the second two auxiliary elements are opposite to each other such that the fourth prefabricated cylindrical unit is positioned between the two support columns;

a crossbeam with two ends detachably connected with two top ends of the two support columns, respectively, wherein the crossbeam is provided with at least two pull rods each being positioned at an angle with the crossbeam, each pull rod of the at least two pull rods is detachably connected with an auxiliary element of the plurality of auxiliary elements of the fourth prefabricated cylindrical unit, and a middle of the crossbeam is provided with a pulley;

a windlass fixed on ground, wherein the windlass is located at a first side of the crossbeam, a rope of the windlass is looped over a wheel of the pulley to position an overhanging end of the rope to a second side of the crossbeam that is opposite to the first side, and the overhanging end of the rope is configured to be connected with a prefabricated cylindrical unit to be installed;

a rail extending upward and fixedly connected with the recyclable cylindrical structure being constructed, wherein the rail is provided with a plurality of rubber rollers distributed along the rail and with space apart, and the plurality of rubber rollers are configured to roll and support the prefabricated cylindrical unit to be installed when the prefabricated cylindrical unit to be installed is pulled by the rope of the windlass to move upward; and two lift drive assemblies configured to drive the crossbeam and the two support columns to move up and down, wherein a bottom of each lift drive assembly of the two lift drive assemblies is configured to be detachably connected with the ring block of the current topmost prefabricated cylindrical unit, and a top of each lift drive assembly of the two lift drive assemblies is configured to be detachably connected with the crossbeam.

13. The usage method of claim 11, wherein the second hoisting device comprises:

two support columns detachably connectable with third two auxiliary elements, respectively, of the plurality of auxiliary elements arranged on the outer side wall of a fifth prefabricated cylindrical unit, wherein the fifth prefabricated cylindrical unit is adjacent to and below a current topmost prefabricated cylindrical unit of the recyclable cylindrical structure being demolished and the third two auxiliary elements are opposite to each other such that the current topmost prefabricated cylindrical unit, as a prefabricated cylindrical unit to be uninstalled, is positioned between the two support columns;

a crossbeam with two ends detachably connected with two top ends of the two support columns, respectively, wherein the crossbeam is provided with at least two pull rods each being positioned at an angle with the crossbeam, each pull rod of the at least two pull rods is detachably connected with an auxiliary element of the plurality of auxiliary elements of the fifth prefabricated cylindrical unit, and a middle of the crossbeam is provided with a pulley;

a windlass fixed on ground, wherein the windlass is located at a first side of the crossbeam, a rope of the windlass is looped over a wheel of the pulley to position an overhanging end of the rope to a second side of the crossbeam that is opposite to the first side, and the overhanging end of the rope is configured to be connected with the prefabricated cylindrical unit to be uninstalled;

a rail extending upward and fixedly connected with the recyclable cylindrical structure being demolished, wherein the rail is provided with a plurality of rubber rollers distributed along the rail and with space apart and the plurality of rubber rollers are configured to roll and support the prefabricated cylindrical unit to be uninstalled when the prefabricated cylindrical unit to be uninstalled is moving downward driven by gravity while pulled by the rope of the windlass; and two lift drive assemblies configured to drive the crossbeam and the two support columns to move up and down, wherein a bottom of each lift drive assembly of the two lift drive assemblies is configured to be detachably connected with the ring block of the current topmost prefabricated cylindrical unit and a top of each lift drive assembly of the two lift drive assemblies is configured to be detachably connected with the crossbeam.

\* \* \* \* \*